(12) United States Patent
Dippo et al.

(10) Patent No.: US 12,398,954 B2
(45) Date of Patent: Aug. 26, 2025

(54) HIGH-EFFICIENCY PHOTONIC FURNACES FOR METAL PRODUCTION

(71) Applicant: Limelight Steel Inc., Oakland, CA (US)

(72) Inventors: Olivia Faye Dippo, Oakland, CA (US); Andrew Zigang Zhao, Oakland, CA (US)

(73) Assignee: Limelight Steel Inc., Oakland, CA (US)

( * ) Notice: Subject to any disclaimer, the term of this patent is extended or adjusted under 35 U.S.C. 154(b) by 74 days.

(21) Appl. No.: 18/505,480

(22) Filed: Nov. 9, 2023

(65) Prior Publication Data

US 2024/0183614 A1  Jun. 6, 2024

Related U.S. Application Data

(63) Continuation of application No. 18/176,997, filed on Mar. 1, 2023, now Pat. No. 11,898,798.

(60) Provisional application No. 63/374,330, filed on Sep. 1, 2022.

(51) Int. Cl.
| | | |
|---|---|---|
| *F27B 3/20* | (2006.01) | |
| *B23K 26/06* | (2014.01) | |
| *C21B 13/00* | (2006.01) | |
| *F27B 3/08* | (2006.01) | |
| *F27B 3/14* | (2006.01) | |

(52) U.S. Cl.
CPC ............ *F27B 3/20* (2013.01); *B23K 26/0648* (2013.01); *C21B 13/0006* (2013.01); *C21B 13/0073* (2013.01); *F27B 3/08* (2013.01); *F27B 3/14* (2013.01)

(58) Field of Classification Search
CPC ..... F27B 3/20; F27B 3/08; F27B 3/14; B23K 26/0648; C21B 13/0006; C21B 13/0073; F27D 99/0006
USPC ........... 266/171; 219/121.85, 121, 86, 121.6, 219/121.64, 121.65
See application file for complete search history.

(56) References Cited

U.S. PATENT DOCUMENTS

| | | | |
|---|---|---|---|
| 46,244 | A | 2/1865 | Keen et al. |
| 2,715,575 | A | 8/1955 | Gould et al. |
| 4,389,560 | A | 6/1983 | Mitchell |
| 4,619,441 | A | 10/1986 | Felthuis et al. |
| 5,182,170 | A | 1/1993 | Marcus et al. |
| 5,378,508 | A | 1/1995 | Castro et al. |
| 5,837,960 | A | 11/1998 | Lewis et al. |

(Continued)

FOREIGN PATENT DOCUMENTS

| | | |
|---|---|---|
| CN | 1180901 C | 12/2004 |
| CN | 102424873 A | 4/2012 |

(Continued)

OTHER PUBLICATIONS

EP22764084.4 Extended European Search Report dated Nov. 29, 2024.

(Continued)

*Primary Examiner* — Jessee R Roe
*Assistant Examiner* — Michael Aboagye
(74) *Attorney, Agent, or Firm* — WILSON SONSINI GOODRICH & ROSATI

(57) ABSTRACT

Described herein are photonic furnaces and methods of using the same to produce metal products from a precursor material.

19 Claims, 5 Drawing Sheets

(56) References Cited

U.S. PATENT DOCUMENTS

| | | | |
|---|---|---|---|
| 8,137,638 B2 * | 3/2012 | Yabe | B01J 7/02 422/186 |
| 8,238,732 B2 | 8/2012 | Kao et al. | |
| 9,206,508 B1 | 12/2015 | Hariharan et al. | |
| 10,507,638 B2 | 12/2019 | Nuechterlein et al. | |
| 11,898,798 B1 | 2/2024 | Dippo et al. | |
| 2012/0097653 A1 | 4/2012 | Yabe et al. | |
| 2015/0035209 A1 | 2/2015 | Shah et al. | |
| 2016/0045841 A1 | 2/2016 | Kaplan et al. | |
| 2020/0048724 A1 | 2/2020 | Green et al. | |
| 2021/0002169 A1 | 1/2021 | Gremmelspacher et al. | |
| 2024/0043959 A1 * | 2/2024 | Dippo | C21B 11/10 |

FOREIGN PATENT DOCUMENTS

| | | |
|---|---|---|
| CN | 102634619 A | 8/2012 |
| CN | 205062101 U | 3/2016 |
| CN | 106544695 A | 3/2017 |
| EP | 1862430 A1 | 12/2007 |
| RU | 2348880 C2 | 3/2009 |
| WO | WO-9523246 A1 | 8/1995 |
| WO | WO-2010077179 A2 | 7/2010 |
| WO | WO-2016173248 A1 | 11/2016 |
| WO | WO-2017117041 A1 | 7/2017 |
| WO | WO-2018017079 A1 | 1/2018 |
| WO | WO-2022187533 A1 | 9/2022 |
| WO | WO-2024050060 A1 | 3/2024 |

OTHER PUBLICATIONS

PCT/US2022/018766 International Search Report and Written Opinion dated May 18, 2022.

PCT/US2023/031778 International Search Report and Written Opinion dated Nov. 29, 2023.

Sortwell et al.: A Novel Flash Ironmaking Process. Technical Report, pp. 1-178, American Iron and Steel Inst., Washington, D.C. (US) doi:10.2172/1485414 (2018).

U.S. Appl. No. 18/176,997 Non-Final Office Action dated May 17, 2023.

U.S. Appl. No. 18/176,997 Notice of Allowance dated Oct. 2, 2023.

Zhu et al.: Influence of High Cycle Thermal Loads on Thermal Fatigue Behavior of Thick Thermal Barrier Coatings. NASA Technical paper, pp. 1-51 URL: https://apps.dtic.mil/sti/pdfs/ADA326221.pdf (1997).

* cited by examiner

HIGH-EFFICIENCY PHOTONIC FURNACES FOR METAL PRODUCTION

CROSS-REFERENCE

This application is a continuation of U.S. Non-Provisional application Ser. No. 18/176,997 (now U.S. Pat. No. 11,898,798), filed Mar. 1, 2023, which claims the benefit of U.S. Provisional Application No. 63/374,330, filed Sep. 1, 2022, each of which is incorporated herein by reference in their entirety.

BACKGROUND

Steel production and metal smelting has a large contribution to annual emissions of greenhouse gases including $CO_2$ into the atmosphere in addition to consuming large amounts of energy to convert raw materials into usable metal products. Accordingly, more efficient furnaces and methods of producing metal from raw materials are needed to reduce greenhouse gas emissions and provide more cost-effective ways to produce metallic products.

SUMMARY

In one aspect, described herein are photonic furnaces for producing a metal product from precursor materials. In some embodiments, the photonic furnace comprises one or more light sources producing a light beam. In some embodiments, an emission wavelength of the light beam is shorter than about 600 nm. In some embodiments, the wavelength is about 425 nm to about 475 nm. In some embodiments, the photonic furnace comprises a reaction chamber. In some embodiments, the photonic furnace comprises a precursor material inlet providing access to the reaction chamber. In some embodiments, the photonic furnace comprises a product outlet.

In some embodiments, the light beam of the one or more light sources is capable of providing a sufficient power density at a beam impact area of the light beam to raise a temperature of the beam impact area to at least a reaction temperature within less than about 5 seconds (e.g. about 5 s, 4 s, 3 s, 2 s, 1 s, 0.5 s, or 0.1 s). In some embodiments, the beam impact area is located in the reaction chamber or is located in a preheating chamber, the preheating chamber being connected between the material inlet and the reaction chamber.

In some embodiments, interaction of the precursor material with the beam impact area facilitates conversion of the precursor material to the metal product. In some embodiments, heating of the precursor material by interaction with the beam impact area is capable of converting the precursor material to the metal product. In some embodiments, the metal product is retrievable from the photonic furnace through the product outlet. In some embodiments, the reaction temperature is a melting temperature of at least one component of the precursor material. In some embodiments, the reaction temperature is a temperature required to cause a reducing agent in the reaction chamber to reduce a metal oxide in the reaction chamber.

In some embodiments, the reducing agent is selected from the group consisting of hydrogen, ammonia, carbon, carbon monoxide, and combinations of two or more thereof.

In some embodiments, the reducing agent and the metal oxide are heated separately.

In some embodiments, the reaction chamber comprises steel lined with a refractory ceramic coating, the refractory ceramic coating selected from the group consisting of aluminum oxide, zirconium oxide, silicon carbide, graphite, silicon oxide, and combinations thereof. In some embodiments, the furnace is configured to remove impurities from the precursor material during production of the metal product. In some embodiments, the precursor material is combined with at least one alloying element during production of the metal product. In some embodiments, the metal product is steel, a non-steel alloy comprising iron, or metallic iron and the precursor material is iron ore. In some embodiments, the reaction temperature is at least about 1600° C. (e.g. at least 1600° C., 1700° C., 1800° C., 1900° C., 2000° C., or 2200° C.). In some embodiments, an amount of energy consumed by the furnace during production of the metal product is about 2-12 GJ/tonne of metal product (e.g. about 2, 3, 4, 5, 6, 7, 8, 9, 10, 11, or 12 GJ/tonne of steel).

In some embodiments, an amount of electricity consumed by the furnace during production of the metal product is about 1-6 MWhr/tonne of metal product. In some embodiments, operation of the photonic furnace to produce steel consumes about 30-70% (e.g. 30%, 35%, 40%, 50%, 55%, 60%, 65%, or 70%) less energy than operation of a blast furnace and basic oxygen furnace to produce an equivalent amount of steel. In some embodiments, the total carbon dioxide emissions caused by production of the metal product by the furnace is at least 40% (e.g. about 40, 50, 60, 70, 80, 90, 95, or 99%) less than an equivalent metal product produced by a blast furnace.

In some embodiments, wherein the furnace is capable of producing at least about 178 (e.g. about 200, 500, 1000, 10,000, or 15,000) tonnes of steel per day. In some embodiments, the furnace is designed to be operated in a flow through manner. In some embodiments, the furnace is capable of continuous metal product production. In some embodiments, the one or more light sources comprises a laser or an electroluminescent light emitting diode. In some embodiments, the laser comprises a laser diode. In some embodiments, the one or more light sources are operated on a continuous duty-cycle.

In some embodiments, the one or more light sources are operated on a pulsed duty-cycle. In some embodiments, the light beam of the one or more light sources comprises a plurality of wavelengths. In some embodiments, a maximum intensity of the light beam of each of the one or more light sources is comprised at a single wavelength. In some embodiments, the photonic furnace comprises at least two light sources producing a light beam, wherein an emission wavelength of each light beam is shorter than about 600 nm.

In some embodiments, the beam impact area of the light beams of the at least two light sources is substantially the same point. In some embodiments, beam impact areas of the light beams of the at least two light sources overlap in space by at least 20% (e.g. at least 20%, 30%, 40%, 50%, 60%, 70%, 80%, or 90%). In some embodiments, beam impact areas of the light beams of the at least two light sources overlap in space by no more than about 15% (e.g. no more than 10%, 5%, or 1%).

In some embodiments, the photonic furnace further comprises lenses, wherein the lenses are configured to focus or shape a profile of the beam impact area of the one or more light sources. In some embodiments, the furnace provides a substantially uniform power density at the beam impact area of the one or more light sources. In some embodiments, the furnace provides a total power output to reactor volume ratio of about 5 $kW/m^3$ to about 1600 $kW/m^3$.

In some embodiments, a throughput to reactor volume ratio is at least about 10 g of metal product per second per cubic meter of reactor volume (e.g. about 10 g/sm³, 12 g/sm³, 14 g/sm³, 16 g/sm³, 18 g/sm³, 20 g/sm³, or 100 g/sm³). In some embodiments, a ratio of a total power output of the one or more light sources to a volume of the reactor is at least 5 kW/m³ (e.g. at least 5, 10, 20, 40, 60, 80, 100, 120, or 160 kW/m³). In some embodiments, a total power delivered to the beam impact area is at least 100 W/cm². In some embodiments, a total power delivered to the beam impact area is at least 60 kW/cm². In some embodiments, a ratio of a total power output of the one or more light sources to a volume of the reactor is at least 600 kW/m³ (e.g. at least 600, 800, 1000, 1200, or 1600 kW/m³).

In another aspect, described herein are methods for producing a metal product from a precursor material. In some embodiments, the method comprises providing a photonic furnace as described herein. In some embodiments, the method comprises introducing to a precursor material inlet of the photonic furnace, one or more precursor materials. In some embodiments, the method comprises rapidly heating at least one of the one or more precursor materials to a reaction temperature using the interaction of a light beam of one or more light sources of the photonic furnace with the at least one of the one or more precursor materials. In some embodiments, the method comprises reacting the one or more precursor materials to yield the metal product. In some embodiments, the method comprises retrieving the metal product from the product outlet of the photonic furnace.

In some embodiments, the one or more precursor materials comprise one or more metal oxide. In some embodiments, the one or more precursor materials comprise a reducing agent. In some embodiments, the reducing agent is hydrogen or comprises carbon, hydrogen, carbon monoxide, ammonia, or a combination thereof. In some embodiments, the method further comprises preheating at least one of the one or more precursor materials in the preheating chamber of the photonic furnace.

In some embodiments, the method further comprises removing impurities from at least one of the one or more precursor materials prior to its introduction to the material inlet. In some embodiments, the method further comprises removing impurities from at least one of the one or more precursor materials after its introduction to the material inlet and prior to the reacting. In some embodiments, the method further comprises removing impurities from at least one of the one or more precursor materials after its introduction to the material inlet during or after the reacting.

In some embodiments, the one or more precursor materials comprise one or more alloying elements. In some embodiments, the one or more precursor materials comprise particles of iron oxide. In some embodiments, the one or more precursor materials comprise particles having an average diameter in the range of 10 μm to 10 cm.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
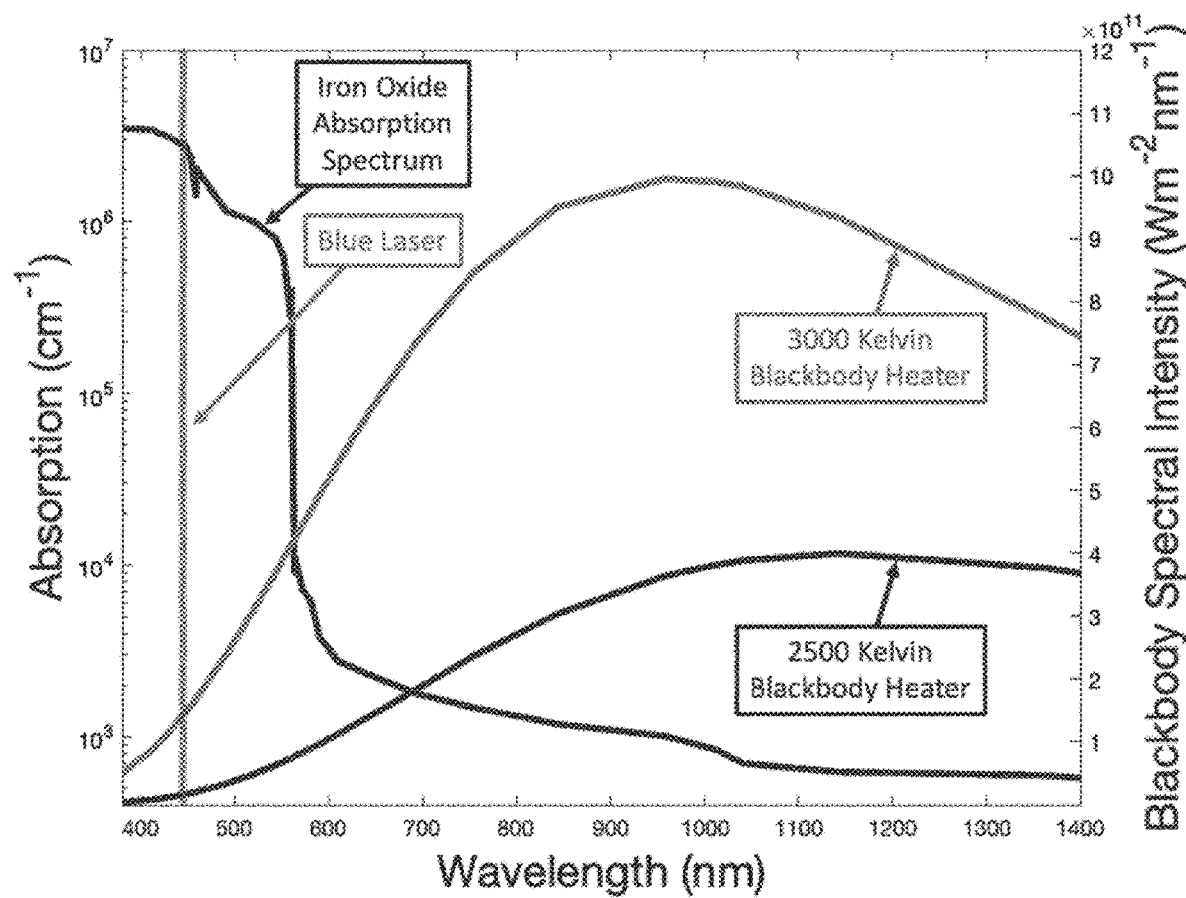
FIG. 1 shows an absorption spectrum of an example metal precursor material (iron oxide) overlayed with the blackbody spectral intensity for blackbody-light sources at two different temperatures. As shown on the figure, a 445 nm light source (for example a blue laser) is efficiently absorbed by iron oxide.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Certain inventive embodiments herein contemplate numerical ranges. When ranges are present, the ranges include the range endpoints. Additionally, every sub range and value within the range is present as if explicitly written out. The term "about" or "approximately" may mean within an acceptable error range for the particular value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where particular values are described in the application and claims, unless otherwise stated the term "about" meaning within an acceptable error range for the particular value may be assumed.

As used herein, "tonne" is a unit of mass which generally refers to a metric ton or 1000 kg.

As used herein, "flux" generally refers to a material that is added to a reaction to facilitate the removal of impurities from a metal precursor or from a mixture which comprises molten metal. Examples of flux include Limestone, Calcium Oxide, Calcium Hydroxide, Calcium Carbonate, Calcium Fluoride, Magnesium Oxide, Magnesium Carbonate, Calcium Magnesium Carbonate, Calcium Fluoride, Silicon Oxide, Sodium Borate, Manganese Oxide, Lithium Chloride, Sodium Chloride, Potassium Chloride, Magnesium Chloride, Ammonium Chloride, Zinc Chloride, Sodium Hexafluoroaluminate, Barium Chloride, and combinations thereof.

As used herein, "base metal" generally refers to the metal which the bulk of the material in an alloy is comprised.

As used herein, "alloy" generally refers to a material which comprises a metal and additional elements (which may also be metals, provided they are a different metal from the base metal). Metal alloys may include impurities, including but not limited to one or additional metals, as well as the same metal having more than one oxidation state. Examples of metal alloys include Stainless steel such as 316 or 316L, austenitic steel such as 304 or 304L, ferritic steel such as 430 or 434, martensitic steel such as 44, High carbon steel such as 1080, Low carbon/mild steel such as A36, Medium carbon/high-tensile steel such as 4140, 4340, Alloy steel such as 6150, 8620, Titanium alloys such as Ti-6A1-4V, and Nickel alloys such as 625, 718.

As used herein, "steel" generally refers to alloys which comprise a base metal of iron.

As used herein, "impurity" generally refers to any element or compound that is not the desired metal or metal alloy.

As used herein, "metal precursor" generally refers to a composition or compound which can be used in the production of a metal product. Examples comprise metal ores, metal oxides, reducing agents, and/or alloying agents.

As used herein, "metal product" generally refers to a composition or material which comprises elements bonded together through metallic bonding. For example, metal products can be produced by thermal or chemical conversion of precursor materials which convert raw ores directly or in a stepwise process wherein the level of metallic bonding in the material is increased through the thermal or chemical conversion.

Described herein are photonic furnaces which can efficiently produce metal products from one or more precursor materials. Photonic furnaces described herein can use one or more light sources to provide heat to one or more precursor materials. Heating of the precursor materials can facilitate or initiate a metal-producing reaction which leads to the conversion of the one or more precursor materials to a metal product.

Metal products can include structural materials, powders, ingots, or other solid objects made from metals such as Beryllium, Lithium, Sodium, Magnesium, Aluminum, Silicon, Potassium, Calcium, Scandium, Titanium, Vanadium, Chromium, Manganese, Iron, Cobalt, Nickel, Copper, Zinc, Gallium, Germanium, Arsenic, Rubidium, Strontium, Yttrium, Zirconium, Niobium, Molybdenum, Technetium, Ruthenium, Rhodium, Palladium, Silver, Cadmium, Indium, Tin, Antimony, Cesium, Barium, Hafnium, Tantalum, Tungsten, Rhenium, Osmium, Iridium, Platinum, Gold, Mercury, Thallium, Lead, Bismuth, Polonium, and/or alloys thereof.

The one or more precursor materials can comprise metal oxides, metal salts, metal containing rocks, and/or other types of metal ores. The one or more precursor materials can comprise reducing agents, flux, and/or alloying elements.

Metal oxides can comprise Iron(II) oxide—wustite (FeO) or magnetite ($Fe_3O_4$), iron(III) oxide—alpha phase hematite ($Fe_2O_3$), beta phase, ($Fe_2O_3$), gamma phase maghemite ($Fe_2O_3$), epsilon phase, ($Fe_2O_3$), Beryllium Oxide, Sodium Oxide, Magnesium Oxide, Aluminum Oxide, Silicon Oxide, Potassium Oxide, Calcium Oxide, Scandium Oxide, Titanium Oxide, Vanadium Oxide, Chromium Oxide, Manganese Oxide, Cobalt Oxide, Nickel Oxide, Copper Oxide, Zinc Oxide, Gallium Oxide, Germanium Oxide, Arsenic Oxide, Rubidium Oxide, Strontium Oxide, Yttrium Oxide, Zirconium Oxide, Niobium Oxide, Molybdenum Oxide, Technetium Oxide, Ruthenium Oxide, Rhodium Oxide, Palladium Oxide, Silver Oxide, Cadmium Oxide, Indium Oxide, Tin Oxide, Antimony Oxide, Cesium Oxide, Barium Oxide, Hafnium Oxide, Tantalum Oxide, Tungsten Oxide, Rhenium Oxide, Osmium Oxide, Iridium Oxide, Platinum Oxide, Gold Oxide, Mercury Oxide, Thallium Oxide, Lead Oxide, Bismuth Oxide, and/or Polonium Oxide.

Reducing agents can comprise hydrogen, carbon (e.g. in the form of a hydrocarbon or carbon monoxide) and/or electrons (e.g. an electrical current utilized in an electrochemical reduction).

Alloying elements can comprise Aluminum, Bismuth, Boron, Carbon, Chromium, Cobalt, Copper, Lead, Manganese, Molybdenum, Nickel, Niobium, Phosphorus, Silicon, Sulfur, Tantalum, Titanium, Tungsten, Vanadium, Zinc, Zirconium, and/or combinations thereof.

Suitable light sources can comprise lasers or light emitting diodes. Incandescent, black-body light sources can also be used provided that they deliver a suitable power density at the ideal wavelength for a particular metal-producing reaction.

Photonic furnaces described herein can offer improved heat transfer efficiency because the wavelength of a light source can be targeted to a maximum absorbance wavelength of one or more of the metal precursor materials. For example, as depicted in FIG. 1, when converting an iron oxide precursor to metallic iron or a steel allow, a 445 nm light source will efficiently heat the iron oxide since this wavelength is close to the absorbance maximum.

When the one or more light sources comprise a laser, the laser can comprise of CO2 lasers (9,200-11,400 nm), Xe—He lasers (2000-4000 nm), He—Ne lasers (~533-633 nm, 1152-3391 nm), Er:YAG lasers (2900-2940 nm), Dye lasers (~380-1000 nm), InGaAs lasers (904-1065 nm), AlGaIn/AsSb lasers (1870-2200 nm), Ti:Sapphire lasers (650-1130 nm), Ruby lasers (694 nm), Cr Fluoride lasers (780-850 nm), Alexandrite lasers (700-800 nm), GaAlAs lasers (750-850 nm), InGaAlP lasers (630-685 nm), GaN lasers (515-520 nm), Copper vapor lasers (510.5 nm), Ar lasers (488-515 nm), InGaN lasers (370-493 nm), Nd:YAG lasers (946-1319 nm), Nd:Glass lasers (1,054 to 1,062 nm), Nitrogen lasers (337 nm), Fiber lasers (500-2100 nm), and/or combinations thereof, depending on the wavelength and power density needed to carry out the desired reaction.

Various lasers may be used to target the wavelengths that are in the absorption band of the metal precursor, In some embodiments, the wavelength may range from about 180 nm to about 10,600 nm. In some embodiments, the wavelength may range from about 300 nm to about 10,000 nm. In some embodiments, the wavelength may range from about 400 nm to about 9,000 nm. In even other embodiments, the laser wavelength may range from about 500 nm to about 8,000 nm. In even other embodiments, the laser wavelength may range from about 600 to about 7,000 nm. In even other embodiments, the laser wavelength may range from about 700 nm to about 6000 nm. In even other embodiments, the laser wavelength may range from about 800 nm to about 5000 nm. In even other embodiments, the laser wavelength may range from about 900 nm to about 4000 nm. In even other embodiments, the wavelength may range from about 1000 nm to about 3000 nm. In even other embodiments, the wavelength may range from about 425 nm to about 475 nm. In even other embodiments, the wavelength may range from about 300 nm to about 700 nm.

Figure 2:
FIG. 2 shows an example metal precursor (iron oxide) in particulate form.

Metal product precursors can be introduced as solids, fluids, gasses or powders. For example, iron oxide can be introduced in powdered form, such as shown in FIG. 2, or in the form of raw ore. Metal product precursors can be introduced by means of gravity, vacuum, pumps, or entrained in a flow of a carrier fluid. Carrier fluids can be liquids, gasses, or flowable powders. The carrier fluid can comprise nitrogen, argon, oxygen, water, compressed air, dry air, methane, ethane, propane, ammonia, carbon monoxide, and/or combinations thereof. These fluids may be used to control the concentration of metal precursors in the reaction chamber and/or to regulate the reaction kinetics and thermodynamics, in addition to being used as a carrier or purge fluid. In some embodiments, these fluids may be housed in an inert gas chamber for eventual mixing with the metal product precursors. In other embodiments, these fluids may be utilized to transfer materials between the one or more chambers of a photonic furnace.

Figure 3:
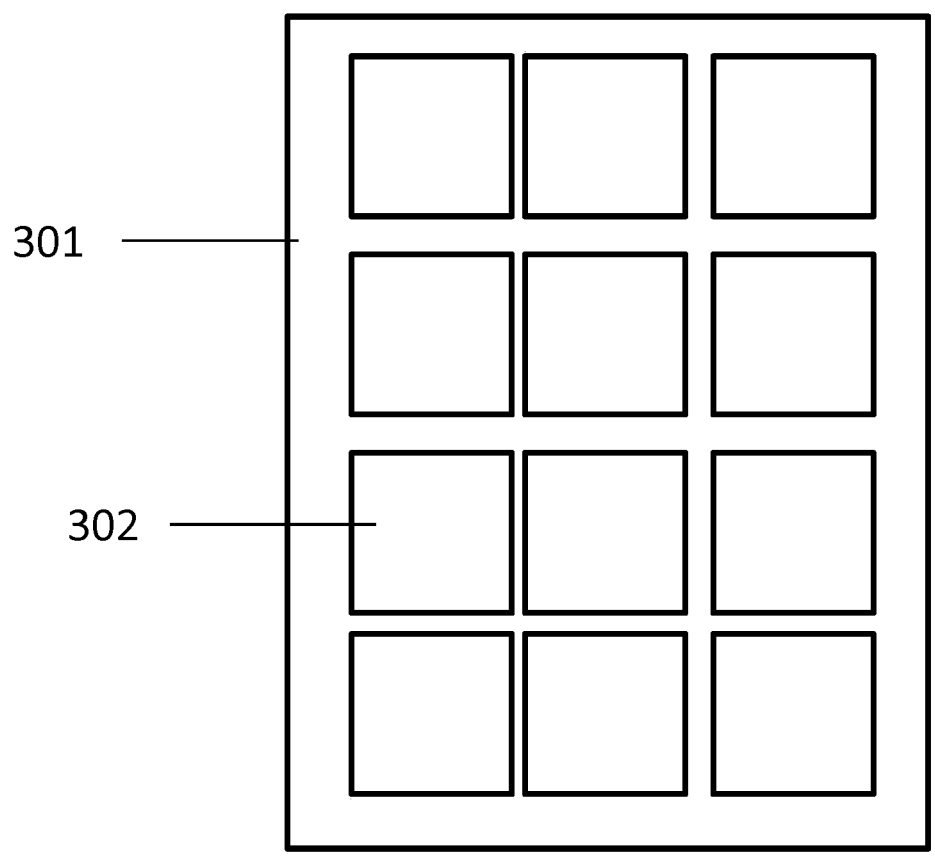
FIG. 3 shows an example array based light source which is suitable for use in the photonic furnaces and methods described herein.

An example of a suitable light source for use in a photonic furnace is depicted in FIG. 3. A primary array 301, can comprise a plurality of smaller secondary arrays 302. Each of the secondary arrays can comprise a plurality of individual light sources, for example a plurality of laser or light emitting diodes. For example, a blue 1MW laser diode array can be used to focus power to a beam impact area where it causes heating of materials which absorb the light from the beam or a plurality of beams.

Figure 4:
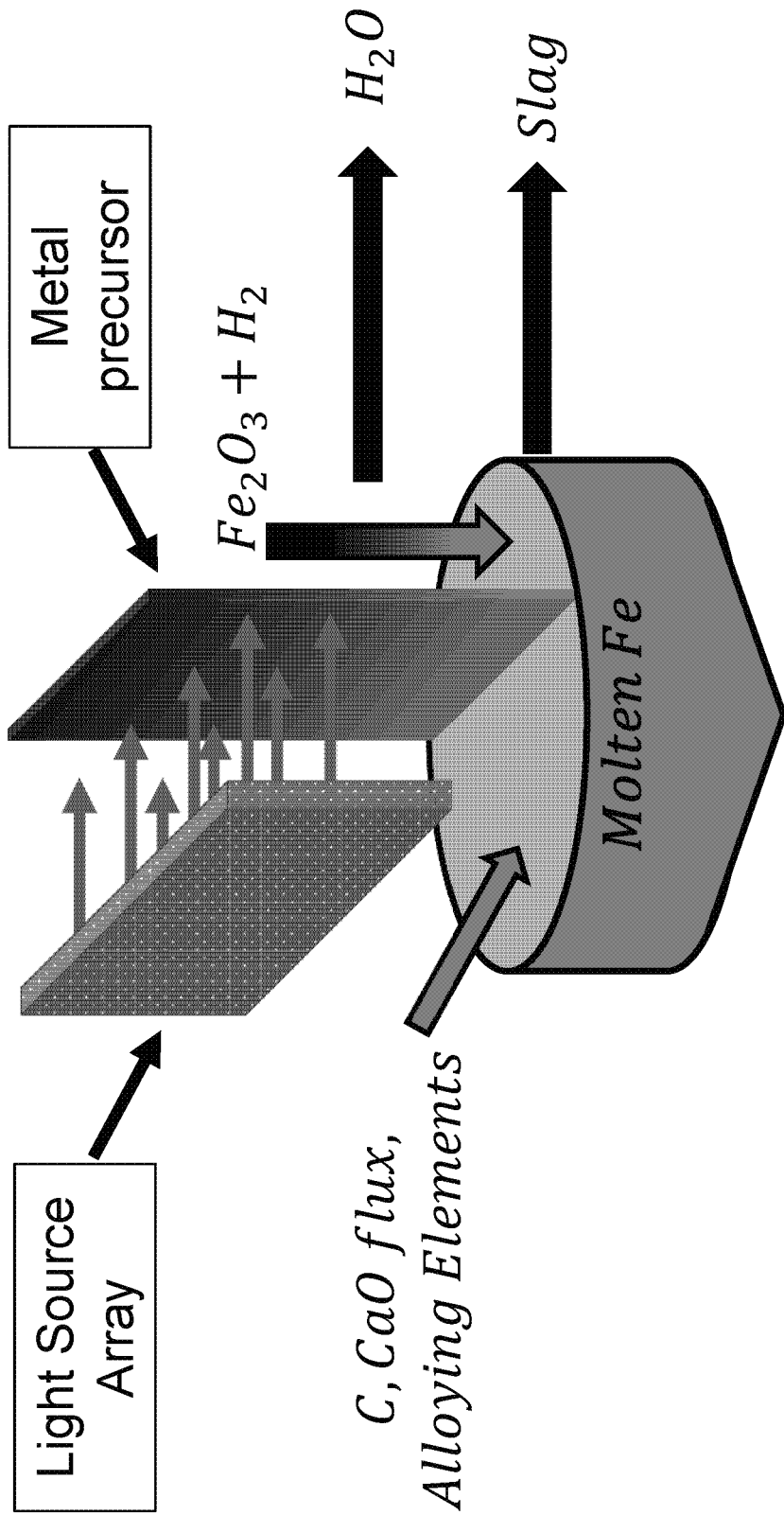
FIG. 4 shows an example workflow of a flow-through photonic furnace as described herein.

An example workflow for production of steel or iron from iron oxide using a continuous-flow photonic furnace employing an array-based light source such as the one detailed in FIG. 3 is depicted in FIG. 4. Iron oxide falls through the path of the light source, causing it to heat up as it falls. Hydrogen is provided as a reducing agent. Reaction of the heated iron oxide with the reducing agent produces metallic iron. In addition to reduced $CO_2$ emissions, of the furnaces and methods used due to more efficient heating leading to reduced energy cost, an additional carbon savings is realized by using hydrogen since the byproduct of the reduction is $H_2O$ rather than $CO_2$ (which would be produced using a carbon-based reducing agent). Flux is added and impurities removed in the form of slag. Alloying elements can further be added to produce a desired steel alloy, which can either be utilized directly or processed further.

Figure 5:
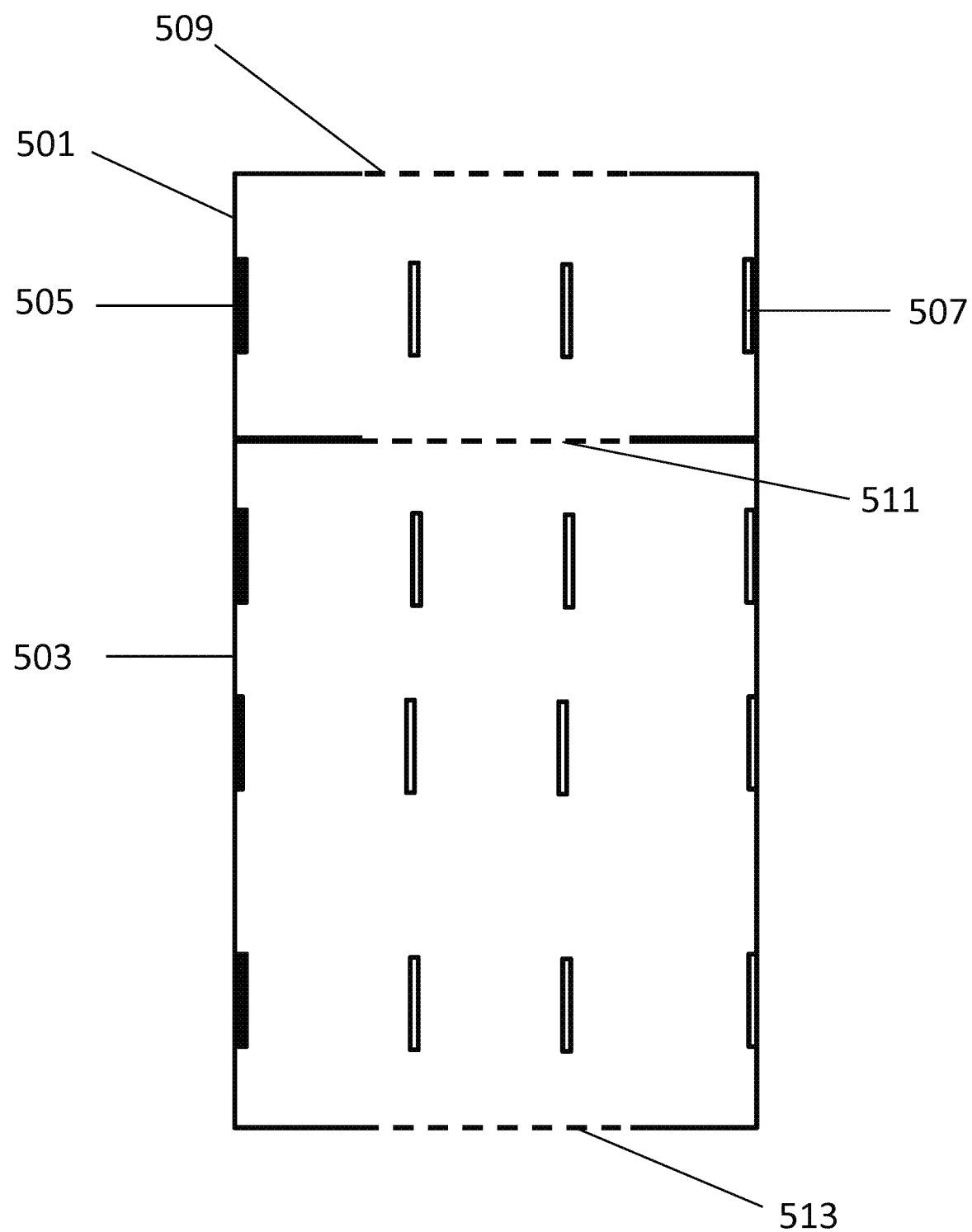
FIG. 5 shows a cross-section diagram of an example embodiment of a photonic furnace as described herein.

An example geometry for a photonic furnace comprising a plurality of light sources is depicted in FIG. 5. Photonic furnaces can comprise an optional preheating chamber 501, a reaction chamber 503, one or more light source 505, one or more beam impact area of the one or more light source 507, which may change based on the presence and location of a precursor material. Photonic furnaces can further comprise a precursor material inlet 509, an optional shutter, divider, or valve 511 for isolating the optional preheating chamber 501 from the reaction chamber 503. Photonic furnaces can further comprise a product outlet 513.

In some embodiments, photonic furnaces can comprise a plurality of additional inlets and/or outlets located to allow introduction of reducing agents or additional metal precursors such as flux or alloying agents and/or to allow removal of slag and other byproducts from the reactor at any stage desired.

The one or more light sources of a photonic furnace can be placed in a variety of layouts. A light source can be focused onto a point, defocused, or split into many beams using a system of optics comprising mirrors, lenses, and fibers. In some embodiments, there may be an array of light sources, arranged in a flat or curved panel.

A photonic furnace may comprise one or more light sources, with a wavelength tuned to be in the absorption band(s) of one or more metal precursor inputs. A photonic furnace may exist in a number of configurations. In some embodiments, the photonic furnace can comprise a single light source (e.g. a single collimated beam laser). In another embodiment, a photonic furnace can comprise a plurality of light sources (e.g. an array of collimated beam lasers or light emitting diodes). In another embodiment, the light source may comprise an array of laser diodes.

In some embodiments, a photonic furnace can be arranged such that falling particles of a metal precursor (e.g. a metal oxide) pass through the beam of at least one light source. The particles can absorb the energy of the beam, causing the particles to be heated to a target temperature as they fall. For example, metal oxide can fall through a drop tube and into beam path of one or more light source together with a reducing agent to form an intermediate metal product. The reducing agent can be pre-heated to a reaction temperature by the light source or another source of heat. The intermediate metal product will have a higher percentage of metal than the metal oxide, having between about 50 and about 99% metallization (i.e. being between about 50% and about 99% metal), with the balance comprising metal oxide and impurities native to the metal oxide.

In some embodiments a rotary kiln can periodically expose metal precursors (e.g. metal oxides) in bulk or particle form to the beam of at least one light source to reach a target temperature. In some embodiments, a stationary or moving bed of metal precursors can be exposed to the light beam to reach a target temperature.

The reducing agent and the metal oxide can be heated separately before combining to produce an intermediate metal product or can be heated simultaneously. In some embodiments, the reducing agent and the metal oxide are heated to the same temperature. In another embodiment, the reducing agent and the metal oxide are heated to different temperatures. In some embodiments, the reducing agent is heated to a target temperature before coming in contact with metal oxide in a photonic furnace. In some embodiments, the metal oxide is heated in the laser furnace to a target temperature and then is contacted with the reducing agent.

In some embodiments, the reaction chamber and/or preheating chamber of a photonic furnace can have a rectangular, square, hexagonal, octagonal, triangular, or other polygonal cross-sectional shape. In some embodiments, the reaction chamber and/or preheating chambers of a photonic furnace can be an irregular shape adapted to the flow of input and output materials. In some embodiments, the body of either chamber can be made from steel or another suitable structural material lined with a refractory ceramic coating on its inner surface.

The refractory ceramic coating may be a number of materials. In some embodiments, the refractory ceramic coating may be aluminum oxide. In some embodiments, the refractory ceramic coating may be zirconium oxide. In some embodiments, the refractory ceramic coating may be silicon carbide. In some embodiments, the refractory ceramic coating may be graphite. In some embodiments, the refractory ceramic coating may be silicon oxide. In some embodiments, the refractory ceramic coating may be combinations of aluminum oxide, zirconium oxide, silicon carbide, graphite, and silicon oxide. In some embodiments, the body of either chamber can be made entirely from the ceramic refractory material. In some embodiments, either chamber can have a non-polygonal cross-sectional shape (e.g. comprising curved surfaces, and the like) designed to facilitate focusing of the energy density of the light beams of the one or more light sources onto a beam impact area.

Impurities can be removed from the intermediate metal product, the metal, or the metal alloy at any step. Fluxes may be used to react with the impurities to remove them from the intermediate metal product, the metal, or the metal alloy and/or to facilitate their removal. In some embodiments, impurities are not removed from the intermediate metal product. In some embodiments, impurities are not removed from the metal. In an embodiment, impurities are not removed from the metal alloy.

Photonic furnaces can comprise a preheating system, which heats metal precursors prior to their entry into the reaction chamber. The preheating system can be before or within a preheating chamber of the photonic furnace. The preheating system may be comprised of a number of components, for example, induction heaters, resistive heaters, electron beams, electric arcs, microwaves, heat pumps, heat exchangers, plasma heaters, and/or combinations thereof.

A photonic furnace may be configured as a falling particle design, shaft furnace, rotary kiln, and/or a fluidized bed design. A photonic furnace can be configured to operate in a continuous, flow through manner or a batch manner.

In some embodiments, flux is added to molten metal or a molten metal precursor to facilitate removal of impurities.

In some embodiments, a series of optics may be used to focus the one or more light sources.

The absorption spectrum of a metal oxide can be used to determine an optimized light source wavelength to be used for heating. Light beams from more than one light source can be combined to provide high power densities and rapid, efficient heating of metal oxides. Metal oxides can be reduced by interacting a light source with the metal oxide to reach a reaction temperature and/or heating the reducing agent to a reaction temperature. The metal oxide and the reducing agent may be heated to the same or different reaction temperatures. A reducing agent can be combined with the metal oxide to produce an intermediate metal product from the reduction of the metal oxide. Impurities can be removed from the intermediate metal product and/or alloying elements can be added to create a metal product. Molten metal or alloy can be atomized to create metal powder, or can be cast, rolled, extruded, or otherwise formed into solid metal objects or construction materials.

In some embodiments, the metal oxide powder may have rounded or spherical shape. In some embodiments the metal oxide powder may have sizes ranging from 10 micrometers to 20 mm in diameter. In some embodiments, the metal powder may have sizes ranging from 10 to 6300 micrometers in diameter. In some embodiments, the metal powder may have sizes ranging from 20 to 75 micrometers in diameter. In some embodiments, the metal powder may have sizes ranging from 45 to 150 micrometers in diameter.

In some embodiments, the reaction temperature is reached in about 0.1 seconds to about 10 seconds. In some embodiments, the reaction temperature is reached in about 0.1 seconds to about 0.5 seconds, about 0.1 seconds to about 1 second, about 0.1 seconds to about 2 seconds, about 0.1 seconds to about 3 seconds, about 0.1 seconds to about 4 seconds, about 0.1 seconds to about 5 seconds, about 0.1 seconds to about 10 seconds, about 0.5 seconds to about 1 second, about 0.5 seconds to about 2 seconds, about 0.5 seconds to about 3 seconds, about 0.5 seconds to about 4 seconds, about 0.5 seconds to about 5 seconds, about 0.5 seconds to about 10 seconds, about 1 second to about 2 seconds, about 1 second to about 3 seconds, about 1 second to about 4 seconds, about 1 second to about 5 seconds, about 1 second to about 10 seconds, about 2 seconds to about 3 seconds, about 2 seconds to about 4 seconds, about 2 seconds to about 5 seconds, about 2 seconds to about 10 seconds, about 3 seconds to about 4 seconds, about 3 seconds to about 5 seconds, about 3 seconds to about 10 seconds, about 4 seconds to about 5 seconds, about 4 seconds to about 10 seconds, or about 5 seconds to about 10 seconds. In some embodiments, the reaction temperature is reached in about 0.1 seconds, about 0.5 seconds, about 1 second, about 2 seconds, about 3 seconds, about 4 seconds, about 5 seconds, or about 10 seconds. In some embodiments, the reaction temperature is reached in at least about 0.1 seconds, about 0.5 seconds, about 1 second, about 2 seconds, about 3 seconds, about 4 seconds, or about 5 seconds. In some embodiments, the reaction temperature is reached in at most about 0.5 seconds, about 1 second, about 2 seconds, about 3 seconds, about 4 seconds, about 5 seconds, or about 10 seconds.

In some embodiments, the reaction temperature is reached in about 10 seconds to about 1,000 seconds. In some embodiments, the reaction temperature is reached in about 10 seconds to about 20 seconds, about 10 seconds to about 50 seconds, about 10 seconds to about 100 seconds, about 10 seconds to about 200 seconds, about 10 seconds to about 500 seconds, about 10 seconds to about 1,000 seconds, about 20 seconds to about 50 seconds, about 20 seconds to about 100 seconds, about 20 seconds to about 200 seconds, about 20 seconds to about 500 seconds, about 20 seconds to about 1,000 seconds, about 50 seconds to about 100 seconds, about 50 seconds to about 200 seconds, about 50 seconds to about 500 seconds, about 50 seconds to about 1,000 seconds, about 100 seconds to about 200 seconds, about 100 seconds to about 500 seconds, about 100 seconds to about 1,000 seconds, about 200 seconds to about 500 seconds, about 200 seconds to about 1,000 seconds, or about 500 seconds to about 1,000 seconds. In some embodiments, the reaction temperature is reached in about 10 seconds, about 20 seconds, about 50 seconds, about 100 seconds, about 200 seconds, about 500 seconds, or about 1,000 seconds. In some embodiments, the reaction temperature is reached in at least about 10 seconds, about 20 seconds, about 50 seconds, about 100 seconds, about 200 seconds, or about 500 seconds. In some embodiments, the reaction temperature is reached in at most about 20 seconds, about 50 seconds, about 100 seconds, about 200 seconds, about 500 seconds, or about 1,000 seconds.

In some embodiments, the reaction temperature is about 500° C. to about 3,500° C. In some embodiments, the reaction temperature is about 500° C. to about 1,000° C., about 500° C. to about 1,500° C., about 500° C. to about 1,600° C., about 500° C. to about 1,700° C., about 500° C. to about 1,800° C., about 500° C. to about 2,000° C., about 500° C. to about 2,200° C., about 500° C. to about 2,500° C., about 500° C. to about 3,000° C., about 500° C. to about 3,500° C., about 1,000° C. to about 1,500° C., about 1,000° C. to about 1,600° C., about 1,000° C. to about 1,700° C., about 1,000° C. to about 1,800° C., about 1,000° C. to about 2,000° C., about 1,000° C. to about 2,200° C., about 1,000° C. to about 2,500° C., about 1,000° C. to about 3,000° C., about 1,000° C. to about 3,500° C., about 1,500° C. to about 1,600° C., about 1,500° C. to about 1,700° C., about 1,500° C. to about 1,800° C., about 1,500° C. to about 2,000° C., about 1,500° C. to about 2,200° C., about 1,500° C. to about 2,500° C., about 1,500° C. to about 3,000° C., about 1,500° C. to about 3,500° C., about 1,600° C. to about 1,700° C., about 1,600° C. to about 1,800° C., about 1,600° C. to about 2,000° C., about 1,600° C. to about 2,200° C., about 1,600° C. to about 2,500° C., about 1,600° C. to about 3,000° C., about 1,600° C. to about 3,500° C., about 1,700° C. to about 1,800° C., about 1,700° C. to about 2,000° C., about 1,700° C. to about 2,200° C., about 1,700° C. to about 2,500° C., about 1,700° C. to about 3,000° C., about 1,700° C. to about 3,500° C., about 1,800° C. to about 2,000° C., about 1,800° C. to about 2,200° C., about 1,800° C. to about 2,500° C., about 1,800° C. to about 3,000° C., about 1,800° C. to about 3,500° C., about 2,000° C. to about 2,200° C., about 2,000° C. to about 2,500° C., about 2,000° C. to about 3,000° C., about 2,000° C. to about 3,500° C., about 2,200° C. to about 2,500° C., about 2,200° C. to about 3,000° C., about 2,200° C. to about 3,500° C., about 2,500° C. to about 3,000° C., about 2,500° C. to about 3,500° C., or about 3,000° C. to about 3,500° C. In some embodiments, the reaction temperature is about 500° C., about 1,000° C., about 1,500° C., about 1,600° C., about 1,700° C., about 1,800° C., about 2,000° C., about 2,200° C., about 2,500° C., about 3,000° C., or about 3,500° C. In some embodiments, the reaction temperature is at least about 500° C., about 1,000° C., about 1,500° C., about 1,600° C., about 1,700° C., about 1,800° C., about 2,000° C., about 2,200° C., about 2,500° C., or about 3,000° C. In some embodiments, the reaction temperature is at most about 1,000° C., about 1,500° C., about 1,600° C., about 1,700° C., about 1,800° C., about 2,000° C., about 2,200° C., about 2,500° C., about 3,000° C., or about 3,500° C.

In some embodiments, amount of energy consumed by the furnace during production of the metal product is about 5 GJ/tonne metal product to about 16 GJ/tonne metal product. In some embodiments, amount of energy consumed by the furnace during production of the metal product is about 5 GJ/tonne metal product to about 6 GJ/tonne metal product, about 5 GJ/tonne metal product to about 8 GJ/tonne metal product, about 5 GJ/tonne metal product to about 10 GJ/tonne metal product, about 5 GJ/tonne metal product to about 12 GJ/tonne metal product, about 5 GJ/tonne metal product to about 14 GJ/tonne metal product, about 5 GJ/tonne metal product to about 16 GJ/tonne metal product, about 6 GJ/tonne metal product to about 8 GJ/tonne metal product, about 6 GJ/tonne metal product to about 10 GJ/tonne metal product, about 6 GJ/tonne metal product to about 12 GJ/tonne metal product, about 6 GJ/tonne metal product to about 14 GJ/tonne metal product, about 6 GJ/tonne metal product to about 16 GJ/tonne metal product, about 8 GJ/tonne metal product to about 10 GJ/tonne metal product, about 8 GJ/tonne metal product to about 12 GJ/tonne metal product, about 8 GJ/tonne metal product to about 14 GJ/tonne metal product, about 8 GJ/tonne metal product to about 16 GJ/tonne metal product, about 10 GJ/tonne metal product to about 12 GJ/tonne metal product, about 10 GJ/tonne metal product to about 14 GJ/tonne metal product, about 10 GJ/tonne metal product to about 16 GJ/tonne metal product, about 12 GJ/tonne metal product to about 14 GJ/tonne metal product, about 12 GJ/tonne metal product to about 16 GJ/tonne metal product, or about 14 GJ/tonne metal product to about 16 GJ/tonne metal product. In some embodiments, amount of energy consumed by the furnace during production of the metal product is about 5 GJ/tonne metal product, about 6 GJ/tonne metal product, about 8 GJ/tonne metal product, about 10 GJ/tonne metal product, about 12 GJ/tonne metal product, about 14 GJ/tonne metal product, or about 16 GJ/tonne metal product. In some embodiments, amount of energy consumed by the furnace during production of the metal product is at least about 5 GJ/tonne metal product, about 6 GJ/tonne metal product, about 8 GJ/tonne metal product, about 10 GJ/tonne metal product, about 12 GJ/tonne metal product, or about 14 GJ/tonne metal product. In some embodiments, amount of energy consumed by the furnace during production of the metal product is at most about 6 GJ/tonne metal product, about 8 GJ/tonne metal product, about 10 GJ/tonne metal product, about 12 GJ/tonne metal product, about 14 GJ/tonne metal product, or about 16 GJ/tonne metal product. In some embodiments, the total carbon dioxide emissions caused by production of the metal product by the furnace is about 40% less than an equivalent metal product produced by a blast furnace to about 99% less than an equivalent metal product produced by a blast furnace. In some embodiments, the total carbon dioxide emissions caused by production of the metal product by the furnace is about 40% less than an equivalent metal product produced by a blast furnace to about 50% less than an equivalent metal product produced by a blast furnace, about 40% less than an equivalent metal product produced by a blast furnace to about 60% less than an equivalent metal product produced by a blast furnace, about 40% less than an equivalent metal product produced by a blast furnace to about 70% less than an equivalent metal product produced by a blast furnace, about 40% less than an equivalent metal product produced by a blast furnace to about 80% less than an equivalent metal product produced by a blast furnace, about 40% less than an equivalent metal product produced by a blast furnace to about 90% less than an equivalent metal product produced by a blast furnace, about 40% less than an equivalent metal product produced by a blast furnace to about 95% less than an equivalent metal product produced by a blast furnace, about 40% less than an equivalent metal product produced by a blast furnace to about 99% less than an equivalent metal product produced by a blast furnace, about 50% less than an equivalent metal product produced by a blast furnace to about 60% less than an equivalent metal product produced by a blast furnace, about 50% less than an equivalent metal product produced by a blast furnace to about 70% less than an equivalent metal product produced by a blast furnace, about 50% less than an equivalent metal product produced by a blast furnace to about 80% less than an equivalent metal product produced by a blast furnace, about 50% less than an equivalent metal product produced by a blast furnace to about 90% less than an equivalent metal product produced by a blast furnace, about 50% less than an equivalent metal product produced by a blast furnace to about 95% less than an equivalent metal product produced by a blast furnace, about 50% less than an equivalent metal product produced by a blast furnace to about 99% less than an equivalent metal product produced by a blast furnace, about 60% less than an equivalent metal product produced by a blast furnace to about 70% less than an equivalent metal product produced by a blast furnace, about 60% less than an equivalent metal product produced by a blast furnace to about 80% less than an equivalent metal product produced by a blast furnace, about 60% less than an equivalent metal product produced by a blast furnace to about 90% less than an equivalent metal product produced by a blast furnace, about 60% less than an equivalent metal product produced by a blast furnace to about 95% less than an equivalent metal product produced by a blast furnace, about 60% less than an equivalent metal product produced by a blast furnace to about 99% less than an equivalent metal product produced by a blast furnace, about 70% less than an equivalent metal product produced by a blast furnace to about 80% less than an equivalent metal product produced by a blast furnace, about 70% less than an equivalent metal product produced by a blast furnace to about 90% less than an equivalent metal product produced by a blast furnace, about 70% less than an equivalent metal product produced by a blast furnace to about 95% less than an equivalent metal product produced by a blast furnace, about 70% less than an equivalent metal product produced by a blast furnace to about 99% less than an equivalent metal product produced by a blast furnace, about 80% less than an equivalent metal product produced by a blast furnace to about 90% less than an equivalent metal product produced by a blast furnace, about 80% less than an equivalent metal product produced by a blast furnace to about 95% less than an equivalent metal product produced by a blast furnace, about 80% less than an equivalent metal product produced by a blast furnace to about 99% less than an equivalent metal product produced by a blast furnace, about 90% less than an equivalent metal product produced by a blast furnace to about 95% less than an equivalent metal product produced by a blast furnace, about 90% less than an equivalent metal product produced by a blast furnace to about 99% less than an equivalent metal product produced by a blast furnace, or about 95% less than an equivalent metal product produced by a blast furnace to about 99% less than an equivalent metal product produced by a blast furnace. In some embodiments, the total carbon dioxide emissions caused by production of the metal product by the furnace is about 40% less than an equivalent metal product produced by a blast furnace, about 50% less than an equivalent metal product produced by a blast furnace, about 60% less than an equivalent metal product produced by a blast furnace, about 70% less than an equivalent metal product produced by a blast furnace, about 80% less than an equivalent metal product produced by a blast furnace, about 90% less than an equivalent metal product produced by a blast furnace, about 95% less than an equivalent metal product produced by a blast furnace, or about 99% less than an equivalent metal product produced by a blast furnace. In some embodiments, the total carbon dioxide emissions caused by production of the metal product by the furnace is at least about 40% less than an equivalent metal product produced by a blast furnace, about 50% less than an equivalent metal product produced by a blast furnace, about 60% less than an equivalent metal product produced by a blast furnace, about 70% less than an equivalent metal product produced by a blast furnace, about 80% less than an equivalent metal product produced by a blast furnace, about 90% less than an equivalent metal product produced by a blast furnace, or about 95% less than an equivalent metal product produced by a blast furnace. In some embodiments, the total carbon dioxide emissions caused by production of the metal product by the furnace is at most about 50% less than an equivalent metal product produced by a blast furnace, about 60% less than an equivalent metal product produced by a blast furnace, about 70% less than an equivalent metal product produced by a blast furnace, about 80% less than an equivalent metal product produced by a blast furnace, about 90% less than an equivalent metal product produced by a blast furnace, about 95% less than an equivalent metal product produced by a blast furnace, or about 99% less than an equivalent metal product produced by a blast furnace.

In some embodiments, an amount of electricity consumed by the furnace during production of the metal product is about 1 MWhr/tonne of metal product produced to about 6 MWhr/tonne of metal product produced. In some embodiments, an amount of electricity consumed by the furnace during production of the metal product is about 1 MWhr/tonne of metal product produced to about 1.5 MWhr/tonne of metal product produced, about 1 MWhr/tonne of metal product produced to about 2 MWhr/tonne of metal product produced, about 1 MWhr/tonne of metal product produced to about 2.5 MWhr/tonne of metal product produced, about 1 MWhr/tonne of metal product produced to about 3 MWhr/tonne of metal product produced, about 1 MWhr/tonne of metal product produced to about 3.5 MWhr/tonne of metal product produced, about 1 MWhr/tonne of metal product produced to about 4 MWhr/tonne of metal product produced, about 1 MWhr/tonne of metal product produced to about 4.5 MWhr/tonne of metal product produced, about 1 MWhr/tonne of metal product produced to about 5 MWhr/tonne of metal product produced, about 1 MWhr/tonne of metal product produced to about 5.5 MWhr/tonne of metal product produced, about 1 MWhr/tonne of metal product produced to about 6 MWhr/tonne of metal product produced, about 1.5 MWhr/tonne of metal product produced to about 2 MWhr/tonne of metal product produced, about 1.5 MWhr/tonne of metal product produced to about 2.5 MWhr/tonne of metal product produced, about 1.5 MWhr/tonne of metal product produced to about 3 MWhr/tonne of metal product produced, about 1.5 MWhr/tonne of metal product produced to about 3.5 MWhr/tonne of metal product produced, about 1.5 MWhr/tonne of metal product produced to about 4 MWhr/tonne of metal product produced, about 1.5 MWhr/tonne of metal product produced to about 4.5 MWhr/tonne of metal product produced, about 1.5 MWhr/tonne of metal product produced to about 5 MWhr/tonne of metal product produced, about 1.5 MWhr/tonne of metal product produced to about 5.5 MWhr/tonne of metal product produced, about 1.5 MWhr/tonne of metal product produced to about 6 MWhr/tonne of metal product produced, about 2 MWhr/tonne of metal product produced to about 2.5 MWhr/tonne of metal product produced, about 2 MWhr/tonne of metal product produced to about 3 MWhr/tonne of metal product produced, about 2 MWhr/tonne of metal product produced to about 3.5 MWhr/tonne of metal product produced, about 2 MWhr/tonne of metal product produced to about 4 MWhr/tonne of metal product produced, about 2 MWhr/tonne of metal product produced to about 4.5 MWhr/tonne of metal product produced, about 2 MWhr/tonne of metal product produced to about 5 MWhr/tonne of metal product produced, about 2 MWhr/tonne of metal product produced to about 5.5 MWhr/tonne of metal product produced, about 2 MWhr/tonne of metal product produced to about 6 MWhr/tonne of metal product produced, about 2.5 MWhr/tonne of metal product produced to about 3 MWhr/tonne of metal product produced, about 2.5 MWhr/tonne of metal product produced to about 3.5 MWhr/tonne of metal product produced, about 2.5 MWhr/tonne of metal product produced to about 4 MWhr/tonne of metal product produced, about 2.5 MWhr/tonne of metal product produced to about 4.5 MWhr/tonne of metal product produced, about 2.5 MWhr/tonne of metal product produced to about 5 MWhr/tonne of metal product produced, about 2.5 MWhr/tonne of metal product produced to about 5.5 MWhr/tonne of metal product produced, about 2.5 MWhr/tonne of metal product produced to about 6 MWhr/tonne of metal product produced, about 3 MWhr/tonne of metal product produced to about 3.5 MWhr/tonne of metal product produced, about 3 MWhr/tonne of metal product produced to about 4 MWhr/tonne of metal product produced, about 3 MWhr/tonne of metal product produced to about 4.5 MWhr/tonne of metal product produced, about 3 MWhr/tonne of metal product produced to about 5 MWhr/tonne of metal product produced, about 3 MWhr/tonne of metal product produced to about 5.5 MWhr/tonne of metal product produced, about 3 MWhr/tonne of metal product produced to about 6 MWhr/tonne of metal product produced, about 3.5 MWhr/tonne of metal product produced to about 4 MWhr/tonne of metal product produced, about 3.5 MWhr/tonne of metal product produced to about 4.5 MWhr/tonne of metal product produced, about 3.5 MWhr/tonne of metal product produced to about 5 MWhr/tonne of metal product produced, about 3.5 MWhr/tonne of metal product produced to about 5.5 MWhr/tonne of metal product produced, about 3.5 MWhr/tonne of metal product produced to about 6 MWhr/tonne of metal product produced, about 4 MWhr/tonne of metal product produced to about 4.5 MWhr/tonne of metal product produced, about 4 MWhr/tonne of metal product produced to about 5 MWhr/tonne of metal product produced, about 4 MWhr/tonne of metal product produced to about 5.5 MWhr/tonne of metal product produced, about 4 MWhr/tonne of metal product produced to about 6 MWhr/tonne of metal product produced, about 4.5 MWhr/tonne of metal product produced to about 5 MWhr/tonne of metal product produced, about 4.5 MWhr/tonne of metal product produced to about 5.5 MWhr/tonne of metal product produced, about 4.5 MWhr/tonne of metal product produced to about 6 MWhr/tonne of metal product produced, about 5 MWhr/tonne of metal product produced to about 5.5 MWhr/tonne of metal product produced, about 5 MWhr/tonne of metal product produced to about 6 MWhr/tonne of metal product produced, or about 5.5 MWhr/tonne of metal product produced to about 6 MWhr/tonne of metal product produced. In some embodiments, an amount of electricity consumed by the furnace during production of the metal product is about 1 MWhr/tonne of metal product produced, about 1.5 MWhr/tonne of metal product produced, about 2 MWhr/tonne of metal product produced, about 2.5 MWhr/tonne of metal product produced, about 3 MWhr/tonne of metal product produced, about 3.5 MWhr/tonne of metal product produced, about 4 MWhr/tonne of metal product produced, about 4.5 MWhr/tonne of metal product produced, about 5 MWhr/tonne of metal product produced, about 5.5 MWhr/tonne of metal product produced, or about 6 MWhr/tonne of metal product produced. In some embodiments, an amount of electricity consumed by the furnace during production of the metal product is at least about 1 MWhr/tonne of metal product produced, about 1.5 MWhr/tonne of metal product produced, about 2 MWhr/tonne of metal product produced, about 2.5 MWhr/tonne of metal product produced, about 3 MWhr/tonne of metal product produced, about 3.5 MWhr/tonne of metal product produced, about 4 MWhr/tonne of metal product produced, about 4.5 MWhr/tonne of metal product produced, about 5 MWhr/tonne of metal product produced, or about 5.5 MWhr/tonne of metal product produced. In some embodiments, an amount of electricity consumed by the furnace during production of the metal product is at most about 1.5 MWhr/tonne of metal product produced, about 2 MWhr/tonne of metal product produced, about 2.5 MWhr/tonne of metal product produced, about 3 MWhr/tonne of metal product produced, about 3.5 MWhr/tonne of metal product produced, about 4 MWhr/tonne of metal product produced, about 4.5 MWhr/tonne of metal product produced, about 5 MWhr/tonne of metal product produced, about 5.5 MWhr/tonne of metal product produced, or about 6 MWhr/tonne of metal product produced. In some embodiments, operation of the photonic furnace to produce steel consumes about 50% less energy than operation of a blast furnace to produce an equivalent amount of steel to about 70% less energy than operation of a blast furnace to produce an equivalent amount of steel. In some embodiments, operation of the photonic furnace to produce steel consumes about 50% less energy than operation of a blast furnace to produce an equivalent amount of steel to about 55% less energy than operation of a blast furnace to produce an equivalent amount of steel, about 50% less energy than operation of a blast furnace to produce an equivalent amount of steel to about 60% less energy than operation of a blast furnace to produce an equivalent amount of steel, about 50% less energy than operation of a blast furnace to produce an equivalent amount of steel to about 65% less energy than operation of a blast furnace to produce an equivalent amount of steel, about 50% less energy than operation of a blast furnace to produce an equivalent amount of steel to about 70% less energy than operation of a blast furnace to produce an equivalent amount of steel, about 55% less energy than operation of a blast furnace to produce an equivalent amount of steel to about 60% less energy than operation of a blast furnace to produce an equivalent amount of steel, about 55% less energy than operation of a blast furnace to produce an equivalent amount of steel to about 65% less energy than operation of a blast furnace to produce an equivalent amount of steel, about 55% less energy than operation of a blast furnace to produce an equivalent amount of steel to about 70% less energy than operation of a blast furnace to produce an equivalent amount of steel, about 60% less energy than operation of a blast furnace to produce an equivalent amount of steel to about 65% less energy than operation of a blast furnace to produce an equivalent amount of steel, about 60% less energy than operation of a blast furnace to produce an equivalent amount of steel to about 70% less energy than operation of a blast furnace to produce an equivalent amount of steel, or about 65% less energy than operation of a blast furnace to produce an equivalent amount of steel to about 70% less energy than operation of a blast furnace to produce an equivalent amount of steel. In some embodiments, operation of the photonic furnace to produce steel consumes about 50% less energy than operation of a blast furnace to produce an equivalent amount of steel, about 55% less energy than operation of a blast furnace to produce an equivalent amount of steel, about 60% less energy than operation of a blast furnace to produce an equivalent amount of steel, about 65% less energy than operation of a blast furnace to produce an equivalent amount of steel, or about 70% less energy than operation of a blast furnace to produce an equivalent amount of steel. In some embodiments, operation of the photonic furnace to produce steel consumes at least about 50% less energy than operation of a blast furnace to produce an equivalent amount of steel, about 55% less energy than operation of a blast furnace to produce an equivalent amount of steel, about 60% less energy than operation of a blast furnace to produce an equivalent amount of steel, or about 65% less energy than operation of a blast furnace to produce an equivalent amount of steel. In some embodiments, operation of the photonic furnace to produce steel consumes at most about 55% less energy than operation of a blast furnace to produce an equivalent amount of steel, about 60% less energy than operation of a blast furnace to produce an equivalent amount of steel, about 65% less energy than operation of a blast furnace to produce an equivalent amount of steel, or about 70% less energy than operation of a blast furnace to produce an equivalent amount of steel.

In some embodiments, operation of the photonic furnace to produce steel consumes about 20% less energy than operation of a blast furnace to produce an equivalent amount of steel to about 65% less energy than operation of a blast furnace to produce an equivalent amount of steel. In some embodiments, operation of the photonic furnace to produce steel consumes about 20% less energy than operation of a blast furnace to produce an equivalent amount of steel to about 25% less energy than operation of a blast furnace to produce an equivalent amount of steel, about 20% less energy than operation of a blast furnace to produce an equivalent amount of steel to about 30% less energy than operation of a blast furnace to produce an equivalent amount of steel, about 20% less energy than operation of a blast furnace to produce an equivalent amount of steel to about 35% less energy than operation of a blast furnace to produce an equivalent amount of steel, about 20% less energy than operation of a blast furnace to produce an equivalent amount of steel to about 40% less energy than operation of a blast furnace to produce an equivalent amount of steel, about 20% less energy than operation of a blast furnace to produce an equivalent amount of steel to about 45% less energy than operation of a blast furnace to produce an equivalent amount of steel, about 20% less energy than operation of a blast furnace to produce an equivalent amount of steel to about 50% less energy than operation of a blast furnace to produce an equivalent amount of steel, about 20% less energy than operation of a blast furnace to produce an equivalent amount of steel to about 55% less energy than operation of a blast furnace to produce an equivalent amount of steel, about 20% less energy than operation of a blast furnace to produce an equivalent amount of steel to about 60% less energy than operation of a blast furnace to produce an equivalent amount of steel, about 20% less energy than operation of a blast furnace to produce an equivalent amount of steel to about 65% less energy than operation of a blast furnace to produce an equivalent amount of steel, about 25% less energy than operation of a blast furnace to produce an equivalent amount of steel to about 30% less energy than operation of a blast furnace to produce an equivalent amount of steel, about 25% less energy than operation of a blast furnace to produce an equivalent amount of steel to about 35% less energy than operation of a blast furnace to produce an equivalent amount of steel, about 25% less energy than operation of a blast furnace to produce an equivalent amount of steel to about 40% less energy than operation of a blast furnace to produce an equivalent amount of steel, about 25% less energy than operation of a blast furnace to produce an equivalent amount of steel to about 45% less energy than operation of a blast furnace to produce an equivalent amount of steel, about 25% less energy than operation of a blast furnace to produce an equivalent amount of steel to about 50% less energy than operation of a blast furnace to produce an equivalent amount of steel, about 25% less energy than operation of a blast furnace to produce an equivalent amount of steel to about 55% less energy than operation of a blast furnace to produce an equivalent amount of steel, about 25% less energy than operation of a blast furnace to produce an equivalent amount of steel to about 60% less energy than operation of a blast furnace to produce an equivalent amount of steel, about 25% less energy than operation of a blast furnace to produce an equivalent amount of steel to about 65% less energy than operation of a blast furnace to produce an equivalent amount of steel, about 30% less energy than operation of a blast furnace to produce an equivalent amount of steel to about 35% less energy than operation of a blast furnace to produce an equivalent amount of steel, about 30% less energy than operation of a blast furnace to produce an equivalent amount of steel to about 40% less energy than operation of a blast furnace to produce an equivalent amount of steel, about 30% less energy than operation of a blast furnace to produce an equivalent amount of steel to about 45% less energy than operation of a blast furnace to produce an equivalent amount of steel, about 30% less energy than operation of a blast furnace to produce an equivalent amount of steel to about 50% less energy than operation of a blast furnace to produce an equivalent amount of steel, about 30% less energy than operation of a blast furnace to produce an equivalent amount of steel to about 55% less energy than operation of a blast furnace to produce an equivalent amount of steel, about 30% less energy than operation of a blast furnace to produce an equivalent amount of steel to about 60% less energy than operation of a blast furnace to produce an equivalent amount of steel, about 30% less energy than operation of a blast furnace to produce an equivalent amount of steel to about 65% less energy than operation of a blast furnace to produce an equivalent amount of steel, about 35% less energy than operation of a blast furnace to produce an equivalent amount of steel to about 40% less energy than operation of a blast furnace to produce an equivalent amount of steel, about 35% less energy than operation of a blast furnace to produce an equivalent amount of steel to about 45% less energy than operation of a blast furnace to produce an equivalent amount of steel, about 35% less energy than operation of a blast furnace to produce an equivalent amount of steel to about 50% less energy than operation of a blast furnace to produce an equivalent amount of steel, about 35% less energy than operation of a blast furnace to produce an equivalent amount of steel to about 55% less energy than operation of a blast furnace to produce an equivalent amount of steel, about 35% less energy than operation of a blast furnace to produce an equivalent amount of steel to about 60% less energy than operation of a blast furnace to produce an equivalent amount of steel, about 35% less energy than operation of a blast furnace to produce an equivalent amount of steel to about 65% less energy than operation of a blast furnace to produce an equivalent amount of steel, about 40% less energy than operation of a blast furnace to produce an equivalent amount of steel to about 45% less energy than operation of a blast furnace to produce an equivalent amount of steel, about 40% less energy than operation of a blast furnace to produce an equivalent amount of steel to about 50% less energy than operation of a blast furnace to produce an equivalent amount of steel, about 40% less energy than operation of a blast furnace to produce an equivalent amount of steel to about 55% less energy than operation of a blast furnace to produce an equivalent amount of steel, about 40% less energy than operation of a blast furnace to produce an equivalent amount of steel to about 60% less energy than operation of a blast furnace to produce an equivalent amount of steel, about 40% less energy than operation of a blast furnace to produce an equivalent amount of steel to about 65% less energy than operation of a blast furnace to produce an equivalent amount of steel, about 45% less energy than operation of a blast furnace to produce an equivalent amount of steel to about 50% less energy than operation of a blast furnace to produce an equivalent amount of steel, about 45% less energy than operation of a blast furnace to produce an equivalent amount of steel to about 55% less energy than operation of a blast furnace to produce an equivalent amount of steel, about 45% less energy than operation of a blast furnace to produce an equivalent amount of steel to about 60% less energy than operation of a blast furnace to produce an equivalent amount of steel, about 45% less energy than operation of a blast furnace to produce an equivalent amount of steel to about 65% less energy than operation of a blast furnace to produce an equivalent amount of steel, about 50% less energy than operation of a blast furnace to produce an equivalent amount of steel to about 55% less energy than operation of a blast furnace to produce an equivalent amount of steel, about 50% less energy than operation of a blast furnace to produce an equivalent amount of steel to about 60% less energy than operation of a blast furnace to produce an equivalent amount of steel, about 50% less energy than operation of a blast furnace to produce an equivalent amount of steel to about 65% less energy than operation of a blast furnace to produce an equivalent amount of steel, about 55% less energy than operation of a blast furnace to produce an equivalent amount of steel to about 60% less energy than operation of a blast furnace to produce an equivalent amount of steel, about 55% less energy than operation of a blast furnace to produce an equivalent amount of steel to about 65% less energy than operation of a blast furnace to produce an equivalent amount of steel, or about 60% less energy than operation of a blast furnace to produce an equivalent amount of steel to about 65% less energy than operation of a blast furnace to produce an equivalent amount of steel. In some embodiments, operation of the photonic furnace to produce steel consumes about 20% less energy than operation of a blast furnace to produce an equivalent amount of steel, about 25% less energy than operation of a blast furnace to produce an equivalent amount of steel, about 30% less energy than operation of a blast furnace to produce an equivalent amount of steel, about 35% less energy than operation of a blast furnace to produce an equivalent amount of steel, about 40% less energy than operation of a blast furnace to produce an equivalent amount of steel, about 45% less energy than operation of a blast furnace to produce an equivalent amount of steel, about 50% less energy than operation of a blast furnace to produce an equivalent amount of steel, about 55% less energy than operation of a blast furnace to produce an equivalent amount of steel, about 60% less energy than operation of a blast furnace to produce an equivalent amount of steel, or about 65% less energy than operation of a blast furnace to produce an equivalent amount of steel. In some embodiments, operation of the photonic furnace to produce steel consumes at least about 20% less energy than operation of a blast furnace to produce an equivalent amount of steel, about 25% less energy than operation of a blast furnace to produce an equivalent amount of steel, about 30% less energy than operation of a blast furnace to produce an equivalent amount of steel, about 35% less energy than operation of a blast furnace to produce an equivalent amount of steel, about 40% less energy than operation of a blast furnace to produce an equivalent amount of steel, about 45% less energy than operation of a blast furnace to produce an equivalent amount of steel, about 50% less energy than operation of a blast furnace to produce an equivalent amount of steel, about 55% less energy than operation of a blast furnace to produce an equivalent amount of steel, or about 60% less energy than operation of a blast furnace to produce an equivalent amount of steel. In some embodiments, operation of the photonic furnace to produce steel consumes at most about 25% less energy than operation of a blast furnace to produce an equivalent amount of steel, about 30% less energy than operation of a blast furnace to produce an equivalent amount of steel, about 35% less energy than operation of a blast furnace to produce an equivalent amount of steel, about 40% less energy than operation of a blast furnace to produce an equivalent amount of steel, about 45% less energy than operation of a blast furnace to produce an equivalent amount of steel, about 50% less energy than operation of a blast furnace to produce an equivalent amount of steel, about 55% less energy than operation of a blast furnace to produce an equivalent amount of steel, about 60% less energy than operation of a blast furnace to produce an equivalent amount of steel, or about 65% less energy than operation of a blast furnace to produce an equivalent amount of steel.

In some embodiments, the furnace is capable of producing about 100 tonnes of metal product per day to about 15,000 tonnes of metal product per day. In some embodiments, the furnace is capable of producing about 100 tonnes of metal product per day to about 200 tonnes of metal product per day, about 100 tonnes of metal product per day to about 500 tonnes of metal product per day, about 100 tonnes of metal product per day to about 1,000 tonnes of metal product per day, about 100 tonnes of metal product per day to about 10,000 tonnes of metal product per day, about 100 tonnes of metal product per day to about 15,000 tonnes of metal product per day, about 200 tonnes of metal product per day to about 500 tonnes of metal product per day, about 200 tonnes of metal product per day to about 1,000 tonnes of metal product per day, about 200 tonnes of metal product per day to about 10,000 tonnes of metal product per day, about 200 tonnes of metal product per day to about 15,000 tonnes of metal product per day, about 500 tonnes of metal product per day to about 1,000 tonnes of metal product per day, about 500 tonnes of metal product per day to about 10,000 tonnes of metal product per day, about 500 tonnes of metal product per day to about 15,000 tonnes of metal product per day, about 1,000 tonnes of metal product per day to about 10,000 tonnes of metal product per day, about 1,000 tonnes of metal product per day to about 15,000 tonnes of metal product per day, or about 10,000 tonnes of metal product per day to about 15,000 tonnes of metal product per day. In some embodiments, the furnace is capable of producing about 100 tonnes of metal product per day, about 200 tonnes of metal product per day, about 500 tonnes of metal product per day, about 1,000 tonnes of metal product per day, about 10,000 tonnes of metal product per day, or about 15,000 tonnes of metal product per day. In some embodiments, the furnace is capable of producing at least about 100 tonnes of metal product per day, about 200 tonnes of metal product per day, about 500 tonnes of metal product per day, about 1,000 tonnes of metal product per day, or about 10,000 tonnes of metal product per day. In some embodiments, the furnace is capable of producing at most about 200 tonnes of metal product per day, about 500 tonnes of metal product per day, about 1,000 tonnes of metal product per day, about 10,000 tonnes of metal product per day, or about 15,000 tonnes of metal product per day.

In some embodiments, beam impact areas of the light beams of at least two light sources overlap in space by about 20% to about 90%. In some embodiments, beam impact areas of the light beams of at least two light sources overlap in space by about 20% to about 30%, about 20% to about 40%, about 20% to about 50%, about 20% to about 60%, about 20% to about 70%, about 20% to about 80%, about 20% to about 90%, about 30% to about 40%, about 30% to about 50%, about 30% to about 60%, about 30% to about 70%, about 30% to about 80%, about 30% to about 90%, about 40% to about 50%, about 40% to about 60%, about 40% to about 70%, about 40% to about 80%, about 40% to about 90%, about 50% to about 60%, about 50% to about 70%, about 50% to about 80%, about 50% to about 90%, about 60% to about 70%, about 60% to about 80%, about 60% to about 90%, about 70% to about 80%, about 70% to about 90%, or about 80% to about 90%. In some embodiments, beam impact areas of the light beams of at least two light sources overlap in space by about 20%, about 30%, about 40%, about 50%, about 60%, about 70%, about 80%, or about 90%. In some embodiments, beam impact areas of the light beams of at least two light sources overlap in space by at least about 20%, about 30%, about 40%, about 50%, about 60%, about 70%, or about 80%. In some embodiments, beam impact areas of the light beams of at least two light sources overlap in space by at most about 30%, about 40%, about 50%, about 60%, about 70%, about 80%, or about 90%.

In some embodiments, beam impact areas of the light beams of at least two light sources overlap in space by about 1% to about 15%. In some embodiments, beam impact areas of the light beams of at least two light sources overlap in space by about 1% to about 5%, about 1% to about 10%, about 1% to about 15%, about 5% to about 10%, about 5% to about 15%, or about 10% to about 15%. In some embodiments, beam impact areas of the light beams of at least two light sources overlap in space by about 1%, about 5%, about 10%, or about 15%. In some embodiments, beam impact areas of the light beams of at least two light sources overlap in space by at least about 1%, about 5%, or about 10%. In some embodiments, beam impact areas of the light beams of at least two light sources overlap in space by at most about 5%, about 10%, or about 15%.

In some embodiments, the throughput to reactor volume ratio is about 10 g of metal product per second per cubic meter of reactor volume to about 100 g of metal product per second per cubic meter of reactor volume. In some embodiments, the throughput to reactor volume ratio is about 10 g of metal product per second per cubic meter of reactor volume to about 20 g of metal product per second per cubic meter of reactor volume, about 10 g of metal product per second per cubic meter of reactor volume to about 30 g of metal product per second per cubic meter of reactor volume, about 10 g of metal product per second per cubic meter of reactor volume to about 40 g of metal product per second per cubic meter of reactor volume, about 10 g of metal product per second per cubic meter of reactor volume to about 50 g of metal product per second per cubic meter of reactor volume, about 10 g of metal product per second per cubic meter of reactor volume to about 60 g of metal product per second per cubic meter of reactor volume, about 10 g of metal product per second per cubic meter of reactor volume to about 70 g of metal product per second per cubic meter of reactor volume, about 10 g of metal product per second per cubic meter of reactor volume to about 80 g of metal product per second per cubic meter of reactor volume, about 10 g of metal product per second per cubic meter of reactor volume to about 90 g of metal product per second per cubic meter of reactor volume, about 10 g of metal product per second per cubic meter of reactor volume to about 95 g of metal product per second per cubic meter of reactor volume, about 10 g of metal product per second per cubic meter of reactor volume to about 100 g of metal product per second per cubic meter of reactor volume, about 20 g of metal product per second per cubic meter of reactor volume to about 30 g of metal product per second per cubic meter of reactor volume, about 20 g of metal product per second per cubic meter of reactor volume to about 40 g of metal product per second per cubic meter of reactor volume, about 20 g of metal product per second per cubic meter of reactor volume to about 50 g of metal product per second per cubic meter of reactor volume, about 20 g of metal product per second per cubic meter of reactor volume to about 60 g of metal product per second per cubic meter of reactor volume, about 20 g of metal product per second per cubic meter of reactor volume to about 70 g of metal product per second per cubic meter of reactor volume, about 20 g of metal product per second per cubic meter of reactor volume to about 80 g of metal product per second per cubic meter of reactor volume, about 20 g of metal product per second per cubic meter of reactor volume to about 90 g of metal product per second per cubic meter of reactor volume, about 20 g of metal product per second per cubic meter of reactor volume to about 95 g of metal product per second per cubic meter of reactor volume, about 20 g of metal product per second per cubic meter of reactor volume to about 100 g of metal product per second per cubic meter of reactor volume, about 30 g of metal product per second per cubic meter of reactor volume to about 40 g of metal product per second per cubic meter of reactor volume, about 30 g of metal product per second per cubic meter of reactor volume to about 50 g of metal product per second per cubic meter of reactor volume, about 30 g of metal product per second per cubic meter of reactor volume to about 60 g of metal product per second per cubic meter of reactor volume, about 30 g of metal product per second per cubic meter of reactor volume to about 70 g of metal product per second per cubic meter of reactor volume, about 30 g of metal product per second per cubic meter of reactor volume to about 80 g of metal product per second per cubic meter of reactor volume, about 30 g of metal product per second per cubic meter of reactor volume to about 90 g of metal product per second per cubic meter of reactor volume, about 30 g of metal product per second per cubic meter of reactor volume to about 95 g of metal product per second per cubic meter of reactor volume, about 30 g of metal product per second per cubic meter of reactor volume to about 100 g of metal product per second per cubic meter of reactor volume, about 40 g of metal product per second per cubic meter of reactor volume to about 50 g of metal product per second per cubic meter of reactor volume, about 40 g of metal product per second per cubic meter of reactor volume to about 60 g of metal product per second per cubic meter of reactor volume, about 40 g of metal product per second per cubic meter of reactor volume to about 70 g of metal product per second per cubic meter of reactor volume, about 40 g of metal product per second per cubic meter of reactor volume to about 80 g of metal product per second per cubic meter of reactor volume, about 40 g of metal product per second per cubic meter of reactor volume to about 90 g of metal product per second per cubic meter of reactor volume, about 40 g of metal product per second per cubic meter of reactor volume to about 95 g of metal product per second per cubic meter of reactor volume, about 40 g of metal product per second per cubic meter of reactor volume to about 100 g of metal product per second per cubic meter of reactor volume, about 50 g of metal product per second per cubic meter of reactor volume to about 60 g of metal product per second per cubic meter of reactor volume, about 50 g of metal product per second per cubic meter of reactor volume to about 70 g of metal product per second per cubic meter of reactor volume, about 50 g of metal product per second per cubic meter of reactor volume to about 80 g of metal product per second per cubic meter of reactor volume, about 50 g of metal product per second per cubic meter of reactor volume to about 90 g of metal product per second per cubic meter of reactor volume, about 50 g of metal product per second per cubic meter of reactor volume to about 95 g of metal product per second per cubic meter of reactor volume, about 50 g of metal product per second per cubic meter of reactor volume to about 100 g of metal product per second per cubic meter of reactor volume, about 60 g of metal product per second per cubic meter of reactor volume to about 70 g of metal product per second per cubic meter of reactor volume, about 60 g of metal product per second per cubic meter of reactor volume to about 80 g of metal product per second per cubic meter of reactor volume, about 60 g of metal product per second per cubic meter of reactor volume to about 90 g of metal product per second per cubic meter of reactor volume, about 60 g of metal product per second per cubic meter of reactor volume to about 95 g of metal product per second per cubic meter of reactor volume, about 60 g of metal product per second per cubic meter of reactor volume to about 100 g of metal product per second per cubic meter of reactor volume, about 70 g of metal product per second per cubic meter of reactor volume to about 80 g of metal product per second per cubic meter of reactor volume, about 70 g of metal product per second per cubic meter of reactor volume to about 90 g of metal product per second per cubic meter of reactor volume, about 70 g of metal product per second per cubic meter of reactor volume to about 95 g of metal product per second per cubic meter of reactor volume, about 70 g of metal product per second per cubic meter of reactor volume to about 100 g of metal product per second per cubic meter of reactor volume, about 80 g of metal product per second per cubic meter of reactor volume to about 90 g of metal product per second per cubic meter of reactor volume, about 80 g of metal product per second per cubic meter of reactor volume to about 95 g of metal product per second per cubic meter of reactor volume, about 80 g of metal product per second per cubic meter of reactor volume to about 100 g of metal product per second per cubic meter of reactor volume, about 90 g of metal product per second per cubic meter of reactor volume to about 95 g of metal product per second per cubic meter of reactor volume, about 90 g of metal product per second per cubic meter of reactor volume to about 100 g of metal product per second per cubic meter of reactor volume, or about 95 g of metal product per second per cubic meter of reactor volume to about 100 g of metal product per second per cubic meter of reactor volume. In some embodiments, the throughput to reactor volume ratio is about 10 g of metal product per second per cubic meter of reactor volume, about 20 g of metal product per second per cubic meter of reactor volume, about 30 g of metal product per second per cubic meter of reactor volume, about 40 g of metal product per second per cubic meter of reactor volume, about 50 g of metal product per second per cubic meter of reactor volume, about 60 g of metal product per second per cubic meter of reactor volume, about 70 g of metal product per second per cubic meter of reactor volume, about 80 g of metal product per second per cubic meter of reactor volume, about 90 g of metal product per second per cubic meter of reactor volume, about 95 g of metal product per second per cubic meter of reactor volume, or about 100 g of metal product per second per cubic meter of reactor volume. In some embodiments, the throughput to reactor volume ratio is at least about 10 g of metal product per second per cubic meter of reactor volume, about 20 g of metal product per second per cubic meter of reactor volume, about 30 g of metal product per second per cubic meter of reactor volume, about 40 g of metal product per second per cubic meter of reactor volume, about 50 g of metal product per second per cubic meter of reactor volume, about 60 g of metal product per second per cubic meter of reactor volume, about 70 g of metal product per second per cubic meter of reactor volume, about 80 g of metal product per second per cubic meter of reactor volume, about 90 g of metal product per second per cubic meter of reactor volume, or about 95 g of metal product per second per cubic meter of reactor volume. In some embodiments, the throughput to reactor volume ratio is at most about 20 g of metal product per second per cubic meter of reactor volume, about 30 g of metal product per second per cubic meter of reactor volume, about 40 g of metal product per second per cubic meter of reactor volume, about 50 g of metal product per second per cubic meter of reactor volume, about 60 g of metal product per second per cubic meter of reactor volume, about 70 g of metal product per second per cubic meter of reactor volume, about 80 g of metal product per second per cubic meter of reactor volume, about 90 g of metal product per second per cubic meter of reactor volume, about 95 g of metal product per second per cubic meter of reactor volume, or about 100 g of metal product per second per cubic meter of reactor volume.

In some embodiments, the ratio of a total power output of the one or more light sources to a volume of the reactor is about 5 kW/m$^3$ to about 60 kW/m$^3$. In some embodiments, the ratio of a total power output of the one or more light sources to a volume of the reactor is about 5 kW/m$^3$ to about 10 kW/m$^3$, about 5 kW/m$^3$ to about 15 kW/m$^3$, about 5 kW/m$^3$ to about 20 kW/m$^3$, about 5 kW/m$^3$ to about 25 kW/m$^3$, about 5 kW/m$^3$ to about 30 kW/m$^3$, about 5 kW/m$^3$ to about 35 kW/m$^3$, about 5 kW/m$^3$ to about 40 kW/m$^3$, about 5 kW/m$^3$ to about 45 kW/m$^3$, about 5 kW/m$^3$ to about 50 kW/m$^3$, about 5 kW/m$^3$ to about 55 kW/m$^3$, about 5 kW/m$^3$ to about 60 kW/m$^3$, about 10 kW/m$^3$ to about 15 kW/m$^3$, about 10 kW/m$^3$ to about 20 kW/m$^3$, about 10 kW/m$^3$ to about 25 kW/m$^3$, about 10 kW/m$^3$ to about 30 kW/m$^3$, about 10 kW/m$^3$ to about 35 kW/m$^3$, about 10 kW/m$^3$ to about 40 kW/m$^3$, about 10 kW/m$^3$ to about 45 kW/m$^3$, about 10 kW/m$^3$ to about 50 kW/m$^3$, about 10 kW/m$^3$ to about 55 kW/m$^3$, about 10 kW/m$^3$ to about 60 kW/m$^3$, about 15 kW/m$^3$ to about 20 kW/m$^3$, about 15 kW/m$^3$ to about 25 kW/m$^3$, about 15 kW/m$^3$ to about 30 kW/m$^3$, about 15 kW/m$^3$ to about 35 kW/m$^3$, about 15 kW/m$^3$ to about 40 kW/m$^3$, about 15 kW/m$^3$ to about 45 kW/m$^3$, about 15 kW/m$^3$ to about 50 kW/m$^3$, about 15 kW/m$^3$ to about 55 kW/m$^3$, about 15 kW/m$^3$ to about 60 kW/m$^3$, about 20 kW/m$^3$ to about 25 kW/m$^3$, about 20 kW/m$^3$ to about 30 kW/m$^3$, about 20 kW/m$^3$ to about 35 kW/m$^3$, about 20 kW/m$^3$ to about 40 kW/m$^3$, about 20 kW/m$^3$ to about 45 kW/m$^3$, about 20 kW/m$^3$ to about 50 kW/m$^3$, about 20 kW/m$^3$ to about 55 kW/m$^3$, about 20 kW/m$^3$ to about 60 kW/m$^3$, about 25 kW/m$^3$ to about 30 kW/m$^3$, about 25 kW/m$^3$ to about 35 kW/m$^3$, about 25 kW/m$^3$ to about 40 kW/m$^3$, about 25 kW/m$^3$ to about 45 kW/m$^3$, about 25 kW/m$^3$ to about 50 kW/m$^3$, about 25 kW/m$^3$ to about 55 kW/m$^3$, about 25 kW/m$^3$ to about 60 kW/m$^3$, about 30 kW/m$^3$ to about 35 kW/m$^3$, about 30 kW/m$^3$ to about 40 kW/m$^3$, about 30 kW/m$^3$ to about 45 kW/m$^3$, about 30 kW/m$^3$ to about 50 kW/m$^3$, about 30 kW/m$^3$ to about 55 kW/m$^3$, about 30 kW/m$^3$ to about 60 kW/m$^3$, about 35 kW/m$^3$ to about 40 kW/m$^3$, about 35 kW/m$^3$ to about 45 kW/m$^3$, about 35 kW/m$^3$ to about 50 kW/m$^3$, about 35 kW/m$^3$ to about 55 kW/m$^3$, about 35 kW/m$^3$ to about 60 kW/m$^3$, about 40 kW/m$^3$ to about 45 kW/m$^3$, about 40 kW/m$^3$ to about 50 kW/m$^3$, about 40 kW/m³ to about 55 kW/m³, about 40 kW/m³ to about 60 kW/m³, about 45 kW/m³ to about 50 kW/m³, about 45 kW/m³ to about 55 kW/m³, about 45 kW/m³ to about 60 kW/m³, about 50 kW/m³ to about 55 kW/m³, about 50 kW/m³ to about 60 kW/m³, or about 55 kW/m³ to about 60 kW/m³. In some embodiments, the ratio of a total power output of the one or more light sources to a volume of the reactor is about 5 kW/m³, about 10 kW/m³, about 15 kW/m³, about 20 kW/m³, about 25 kW/m³, about 30 kW/m³, about 35 kW/m³, about 40 kW/m³, about 45 kW/m³, about 50 kW/m³, about 55 kW/m³, or about 60 kW/m³. In some embodiments, the ratio of a total power output of the one or more light sources to a volume of the reactor is at least about 5 kW/m³, about 10 kW/m³, about 15 kW/m³, about 20 kW/m³, about 25 kW/m³, about 30 kW/m³, about 35 kW/m³, about 40 kW/m³, about 45 kW/m³, about 50 kW/m³, or about 55 kW/m³. In some embodiments, the ratio of a total power output of the one or more light sources to a volume of the reactor is at most about 10 kW/m³, about 15 kW/m³, about 20 kW/m³, about 25 kW/m³, about 30 kW/m³, about 35 kW/m³, about 40 kW/m³, about 45 kW/m³, about 50 kW/m³, about 55 kW/m³, or about 60 kW/m³.

In some embodiments, the ratio of a total power output of the one or more light sources to a volume of the reactor is about 60 kW/m³ to about 160 kW/m³. In some embodiments, the ratio of a total power output of the one or more light sources to a volume of the reactor is about 60 kW/m³ to about 80 kW/m³, about 60 kW/m³ to about 100 kW/m³, about 60 kW/m³ to about 120 kW/m³, about 60 kW/m³ to about 140 kW/m³, about 60 kW/m³ to about 160 kW/m³, about 80 kW/m³ to about 100 kW/m³, about 80 kW/m³ to about 120 kW/m³, about 80 kW/m³ to about 140 kW/m³, about 80 kW/m³ to about 160 kW/m³, about 100 kW/m³ to about 120 kW/m³, about 100 kW/m³ to about 140 kW/m³, about 100 kW/m³ to about 160 kW/m³, about 120 kW/m³ to about 140 kW/m³, about 120 kW/m³ to about 160 kW/m³, or about 140 kW/m³ to about 160 kW/m³. In some embodiments, the ratio of a total power output of the one or more light sources to a volume of the reactor is about 60 kW/m³, about 80 kW/³, about 100 kW/m³, about 120 kW/m³, about 140 kW/m³, or about 160 kW/m³. In some embodiments, the ratio of a total power output of the one or more light sources to a volume of the reactor is at least about 60 kW/m³, about 80 kW/m³, about 100 kW/m³, about 120 kW/m³, or about 140 kW/m³. In some embodiments, the ratio of a total power output of the one or more light sources to a volume of the reactor is at most about 80 kW/m³, about 100 kW/m³, about 120 kW/m³, about 140 kW/m³, or about 160 kW/m³.

In some embodiments, the optical power density delivered to the impact area is about 50 W/cm² to about 600 W/cm². In some embodiments, the total optical power delivered to each beam impact area is about 50 W/cm² to about 100 W/cm², about 50 W/cm² to about 200 W/cm², about 50 W/cm² to about 300 W/cm², about 50 W/cm² to about 600 W/cm², about 100 W/cm² to about 200 W/cm², about 100 W/cm² to about 300 W/cm², about 100 W/cm² to about 600 W/cm², about 200 W/cm² to about 300 W/cm², about 200 W/cm² to about 600 W/cm², or about 300 W/cm² to about 600 W/cm². In some embodiments, the total power delivered to each beam impact area is about 50 W/cm², about 100 W/cm², about 200 W/cm², about 300 W/cm², or about 600 W/cm². In some embodiments, the total power delivered to each beam impact area is at least about 50 W/cm², about 100 W/cm², about 200 W/cm², or about 300 W/cm². In some embodiments, the total power delivered to each beam impact area is at most about 100 W/cm², about 200 W/cm², about 300 W/cm², or about 600 W/cm².

In some embodiments, the optical power density delivered to the beam impact area is about 60 W/cm² to about 120 W/cm². In some embodiments, the total power delivered to each beam impact area is about 60 W/cm² to about 80 W/cm², about 60 W/cm² to about 120 W/cm², or about 80 W/cm² to about 120 W/cm². In some embodiments, the total power delivered to each beam impact area is about 60 W/cm², about 80 W/cm², or about 120 W/cm². In some embodiments, the total power delivered to each beam impact area is at least about 60 W/cm², or about 80 W/cm². In some embodiments, the total power delivered to each beam impact area is at most about 80 W/cm², or about 120 W/cm².

In some embodiments, the ratio of a total power output of the one or more light sources to a volume of the reactor is about 600 kW/m³ to about 1,600 kW/m³. In some embodiments, the ratio of a total power output of the one or more light sources to a volume of the reactor is about 600 kW/m³ to about 800 kW/m³, about 600 kW/m³ to about 1,000 kW/m³, about 600 kW/m³ to about 1,200 kW/m³, about 600 kW/m³ to about 1,600 kW/m³, about 800 kW/m³ to about 1,000 kW/m³, about 800 kW/m³ to about 1,200 kW/m³, about 800 kW/m³ to about 1,600 kW/m³, about 1,000 kW/m³ to about 1,200 kW/m³, about 1,000 kW/m³ to about 1,600 kW/m³, or about 1,200 kW/m³ to about 1,600 kW/m³. In some embodiments, the ratio of a total power output of the one or more light sources to a volume of the reactor is about 600 kW/m³, about 800 kW/m³, about 1,000 kW/m³, about 1,200 kW/m³, or about 1,600 kW/m³. In some embodiments, the ratio of a total power output of the one or more light sources to a volume of the reactor is at least about 600 kW/m³, about 800 kW/m³, about 1,000 kW/m³, or about 1,200 kW/m³. In some embodiments, the ratio of a total power output of the one or more light sources to a volume of the reactor is at most about 800 kW/m³, about 1,000 kW/m³, about 1,200 kW/m³, or about 1,600 kW/m³.

EXAMPLES

Example 1: Efficient Production of Carbon-Steel or Metallic Iron from Iron Oxide Using a Photonic Furnace Described Herein Reducing agents of hydrogen, carbon, or carbon monoxide are heated to temperatures ranging of at least 1500° C. by the preheating system of a flow-through photonic furnace as described herein. Iron oxide is heated to a temperature of at least 1600° C. within 5 seconds through interaction with a 445 nm light source. The iron oxide metal precursor is dropped through the reaction chamber in the form of particles with particle sizes ranging from about 1 micron to about 6.3 mm. Following iron production, alloying elements are added to iron to produce steel. Steel alloys are produced, including but not limited to Stainless steel such as 316 or 316L, austenitic steel such as 304 or 304L, ferritic steel such as 430 or 434, martensitic steel such as 440, high carbon steel such as 1080, low carbon/mild steel such as A36, medium carbon/high-tensile steel such as 4140, 4340, and Alloy steel such as 6150, 8620.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

Example Embodiments

1. A photonic furnace for producing a metal product from a precursor material, the photonic furnace comprising:
    one or more light sources producing a light beam, wherein an emission wavelength of the light beam is shorter than about 600 nm;
    a reaction chamber;
    a precursor material inlet providing access to the reaction chamber;
    a product outlet;
    wherein the light beam of the one or more light sources is capable of providing a sufficient power density at a beam impact area of the light beam to raise a temperature of the beam impact area to at least a reaction temperature within less than about 5 seconds (e.g. about 5 s, 4 s, 3 s, 2 s, 1 s, 0.5 s, or 0.1 s);
    wherein the beam impact area is located in the reaction chamber or is located in a preheating chamber, the preheating chamber being connected between the material inlet and the reaction chamber;
    wherein heating of the precursor material by interaction with the beam impact area is capable of converting the precursor material to the metal product; and wherein the metal product is retrievable from the photonic furnace through the product outlet.
2. The photonic furnace of embodiment 1, wherein the reaction temperature is a melting temperature of at least one component of the precursor material.
3. The photonic furnace of embodiment 1, wherein the reaction temperature is a temperature required to cause a reducing agent in the reaction chamber to reduce a metal oxide in the reaction chamber.
4. The photonic furnace of embodiment 3, wherein the reducing agent is selected from the group consisting of hydrogen, ammonia, carbon, carbon monoxide, and combinations of two or more thereof.
5. The photonic furnace of any of embodiments 3-4, wherein the reducing agent and the metal oxide are heated separately.
6. The photonic furnace of any of embodiments 1-5, wherein the wavelength is about 425 nm to about 475 nm.
7. The photonic furnace of any of the preceding embodiments, wherein the reaction chamber comprises steel lined with a refractory ceramic coating, the refractory ceramic coating selected from the group consisting of aluminum oxide, zirconium oxide, silicon carbide, graphite, silicon oxide, and combinations thereof.
8. The photonic furnace of any of the preceding embodiments, wherein the furnace is configured to remove impurities from the precursor material during production of the metal product.
9. The photonic furnace of any of the preceding embodiments, wherein the precursor material is combined with at least one alloying element during production of the metal product.
10. The photonic furnace of any of the preceding embodiments, wherein the metal product is steel, a non-steel alloy comprising iron, or metallic iron and the precursor material is iron ore.
11. The photonic furnace of embodiment 10, wherein the reaction temperature is at least about 1600° C. (e.g. at least 1600° C., 1700° C., 1800° C., 1900° C., 2000° C., or 2200° C.).
12. The photonic furnace of any of embodiments 10-11, wherein an amount of energy consumed by the furnace during production of the metal product is about 2-12 GJ/tonne of metal product (e.g. about 2, 3, 4, 5, 6, 7, 8, 9, 10, 11, or 12 GJ/tonne of steel).
13. The photonic furnace of any of embodiments 10-12, wherein an amount of electricity consumed by the furnace during production of the metal product is about 1-6 MWhr/tonne of metal product.
14. The photonic furnace of any of the preceding embodiments, wherein operation of the photonic furnace to produce steel consumes about 30-70% (e.g. 30%, 35%, 40%, 50%, 55%, 60%, 65%, or 70%) less energy than operation of a blast furnace and basic oxygen furnace to produce an equivalent amount of steel.
15. The photonic furnace of any of the preceding embodiments, wherein the total carbon dioxide emissions caused by production of the metal product by the furnace is at least 40% (e.g. about 40, 50, 60, 70, 80, 90, 95, or 99%) less than an equivalent metal product produced by a blast furnace.
16. The photonic furnace of any of the preceding embodiments, wherein the furnace is capable of producing at least about 178 (e.g. about 200, 500, 1000, 10,000, or 15,000) tonnes of steel per day.
17. The photonic furnace of any of the preceding embodiments, wherein the furnace is designed to be operated in a flow through manner.
18. The photonic furnace of embodiment 17, wherein the furnace is capable of continuous metal product production.
19. The photonic furnace of any of the preceding embodiments, wherein the one or more light sources comprises a laser or an electroluminescent light emitting diode.
20. The photonic furnace of embodiment 19, wherein the laser comprises a laser diode.
21. The photonic furnace of any of the preceding embodiments, wherein the one or more light sources are operated on a continuous duty-cycle.
22. The photonic furnace of any of the preceding embodiments, wherein the one or more light sources are operated on a pulsed duty-cycle.
23. The photonic furnace of any of the preceding embodiments, wherein the light beam of the one or more light sources comprises a plurality of wavelengths.
24. The photonic furnace of any of the preceding embodiments, wherein a maximum intensity of the light beam of each of the one or more light sources is comprised at a single wavelength.
25. The photonic furnace of any of the preceding embodiments, comprising at least two light sources producing a light beam, wherein an emission wavelength of each light beam is shorter than about 600 nm.
26. The photonic furnace of embodiment 25, wherein the beam impact area of the light beams of the at least two light sources is substantially the same point.
27. The photonic furnace of embodiment 25, wherein beam impact areas of the light beams of the at least two light sources overlap in space by at least 20% (e.g. at least 20%, 30%, 40%, 50%, 60%, 70%, 80%, or 90%).
28. The photonic furnace of embodiment 25, wherein beam impact areas of the light beams of the at least two light sources overlap in space by no more than about 15% (e.g. no more than 10%, 5%, or 1%).
29. The photonic furnace of any of the preceding embodiments, further comprising lenses, wherein the lenses are configured to focus or shape a profile of the beam impact area of the one or more light sources.
30. The photonic furnace of any of the preceding embodiments, wherein the furnace provides a substantially uniform power density at the beam impact area of the one or more light sources.
31. The photonic furnace of any of the preceding embodiments, wherein a throughput to reactor volume ratio is at least about 10 g of metal product per second per cubic meter of reactor volume (e.g. about 10 g/sm$^3$, 12 g/sm$^3$, 14 g/sm$^3$, 16 g/sm$^3$, 18 g/sm$^3$, 20 g/sm$^3$, or 100 g/sm$^3$).
32. The photonic furnace of any of the preceding embodiments, wherein a ratio of a total power output of the one or more light sources to a volume of the reactor is at least 5 kW/m$^3$ (e.g. at least 5, 10, 20, 40, 60, 80, 100, 120, or 160 kW/m$^3$).
33. The photonic furnace of any of the preceding embodiments, wherein a total power delivered to the beam impact area is at least 100 W/cm$^2$.
34. The photonic furnace of any of the preceding embodiments, wherein a total power delivered to the beam impact area is at least 60 kW/cm$^2$.
35. The photonic furnace of any of the preceding embodiments, wherein a ratio of a total power output of the one or more light sources to a volume of the reactor is at least 600 kW/m$^3$ (e.g. at least 600, 800, 1000, 1200, or 1600 kW/m$^3$).
36. A method for producing a metal product from a precursor material, the method comprising:
providing the photonic furnace of any one of embodiments 1-35;
introducing to the precursor material inlet, one or more precursor materials;
rapidly heating at least one of the one or more precursor materials to the reaction temperature using the interaction of the light beam of the one or more light sources with the at least one of the one or more precursor materials;
reacting the one or more precursor materials to yield the metal product; and
retrieving the metal product from the product outlet of the photonic furnace.
37. The method of embodiment 36, wherein the one or more precursor materials comprise one or more metal oxide.
38. The method of any one of embodiments 36-37, wherein the one or more precursor materials comprise a reducing agent.
39. The method of embodiment 38, wherein the reducing agent is hydrogen or comprises carbon, hydrogen, carbon monoxide, ammonia, or a combination thereof.
40. The method of any one of embodiments 36-39, further comprising preheating at least one of the one or more precursor materials in the preheating chamber of the photonic furnace.
41. The method of any one of embodiments 36-40, further comprising removing impurities from at least one of the one or more precursor materials prior to its introduction to the material inlet.
42. The method of any one of embodiments 36-41, further comprising removing impurities from at least one of the one or more precursor materials after its introduction to the material inlet and prior to the reacting.
43. The method of any one of embodiments 36-42, further comprising removing impurities from at least one of the one or more precursor materials after its introduction to the material inlet during or after the reacting.
44. The method of any one of embodiments 36-43, wherein the one or more precursor materials comprise one or more alloying elements.
45. The method of any one of embodiments 36-44, wherein the one or more precursor materials comprise particles of iron oxide.
46. The method of any one of embodiments 36-45, wherein the one or more precursor materials comprise particles having an average diameter in the range of 10 μm to 10 cm.

The invention claimed is:

1. A method for producing a metal product from a precursor material, the method comprising: providing a photonic furnace comprising a reaction chamber, a precursor material inlet, and a product outlet; introducing to the precursor material inlet, one or more precursor materials; heating within less than about 5 seconds at least one of the one or more precursor materials to a reaction temperature associated with the at least one of the one or more precursor materials using an interaction of a light beam of one or more light sources of the photonic furnace with the at least one of the one or more precursor materials, wherein the light beam comprises light produced by one or more laser(s) or electroluminescent light emitting diode(s) and the reaction temperature is at least about 500° C.; reacting the one or more precursor materials to yield the metal product; and retrieving the metal product from the product outlet of the photonic furnace.

2. The method of claim 1, wherein the one or more precursor materials comprise one or more metal oxide.

3. The method of claim 2, wherein the one or more precursor materials comprise a reducing agent.

4. The method of claim 3, wherein the reducing agent is hydrogen gas or comprises carbon, hydrogen, carbon monoxide, ammonia, or a combination thereof.

5. The method of claim 1, further comprising preheating the at least one of the one or more precursor materials in a preheating chamber of the photonic furnace.

6. The method of claim 1, further comprising removing impurities from the at least one of the one or more precursor materials prior to its introduction to the material inlet, or after its introduction to the material inlet and prior to the reacting.

7. The method of claim 1, further comprising removing impurities from the at least one of the one or more precursor materials after its introduction to the material inlet during or after the reacting.

8. The method of claim 1, wherein the one or more precursor materials comprise one or more alloying elements.

9. The method of claim 2, wherein the one or more precursor materials comprise particles of iron oxide.

10. The method of claim 9, wherein the one or more precursor materials comprise particles having an average diameter in the range of 10 μm to 10 cm.

11. The method of claim 10, wherein an emission wavelength of the light beam is less than about 600 nm.

12. The method of claim 11, wherein an amount of energy consumed by the furnace during production of the metal product is less than 18 GJ/tonne of metal product.

13. The method of claim 1, wherein the reaction temperature is a melting temperature of at least one component of the precursor material, wherein the reaction temperature is a decomposition of the at least one component of the precursor material, or wherein the reaction temperature is a temperature required to cause a reducing agent in the reaction chamber to reduce a metal oxide in the reaction chamber.

14. The method of claim 3, wherein the reducing agent and the metal oxide are heated separately.

15. The method of claim 11, wherein the emission wavelength is about 400 nm to about 475 nm.

16. The method of claim 1, wherein the metal product is steel, a non-steel alloy comprising iron, or metallic iron and the precursor material comprises iron ore.

17. The method of claim 1, wherein the reaction temperature is at least about 1600° C.

18. The method of claim 1, wherein a total amount of carbon dioxide emissions caused by production of the metal product is at least 70% less than an equivalent metal product produced by a blast furnace.

19. The method of claim 1, wherein the one or more laser(s) comprises one or more laser diode(s).

* * * * *